US008995736B2

(12) United States Patent
Kaufman et al.

(10) Patent No.: US 8,995,736 B2
(45) Date of Patent: Mar. 31, 2015

(54) SYSTEM AND METHOD FOR PROSTATE VISUALIZATION AND CANCER DETECTION

(75) Inventors: Arie E. Kaufman, Plainview, NY (US); Joseph Marino, Pt. Jefferson Station, NY (US)

(73) Assignee: The Research Foundation of the State University of New York, New York, NY (US)

( * ) Notice: Subject to any disclaimer, the term of this patent is extended or adjusted under 35 U.S.C. 154(b) by 266 days.

(21) Appl. No.: 13/574,438

(22) PCT Filed: Jan. 24, 2011

(86) PCT No.: PCT/US2011/022285
§ 371 (c)(1),
(2), (4) Date: Oct. 9, 2012

(87) PCT Pub. No.: WO2011/091378
PCT Pub. Date: Jul. 28, 2011

(65) Prior Publication Data
US 2013/0034282 A1    Feb. 7, 2013

Related U.S. Application Data

(60) Provisional application No. 61/297,454, filed on Jan. 22, 2010.

(51) Int. Cl.
*G06K 9/00* (2006.01)
*G06T 7/00* (2006.01)
(Continued)

(52) U.S. Cl.
CPC ..... *G06T 7/0014* (2013.01); *G06T 2207/10088* (2013.01); *G06T 2207/30081* (2013.01)

USPC .......................... 382/131; 435/1.14; 600/300

(58) Field of Classification Search
CPC ............... A61B 1/00; G06K 1/00; G06T 1/00
USPC .............. 382/128–134; 378/4, 8, 21–27, 601; 600/407, 410, 425, 427; 435/1.14
See application file for complete search history.

(56) References Cited

U.S. PATENT DOCUMENTS 6,697,538 B1 * 2/2004 Angenent et al. ............. 382/285
8,204,315 B2 * 6/2012 Madabhushi et al. ........ 382/224
(Continued)

FOREIGN PATENT DOCUMENTS

JP      2011-504115      3/2001
JP      2006-518886      8/2006
WO      WO 2007/002146   1/2007

OTHER PUBLICATIONS

International Search Report for International Application No. PCT/US2011/022285 mailed on Mar. 29, 2011.
(Continued)

*Primary Examiner* — Abolfazl Tabatabai
(74) *Attorney, Agent, or Firm* — Andrews Kurth LLP

(57) ABSTRACT

A method, system, and computer-readable medium for detecting a disease of a prostate. Exemplary embodiments of the present disclosure can include receiving an image dataset acquired with at least one acquisition mode; segmenting a region of interest including the prostate from the dataset; applying conformal mapping to map the region of interest to a canonical shape; generating a 3D visualization of the prostate using the canonically mapped dataset; and applying computer aided detection (CAD) to the canonically mapped volume to detect a region of disease of the organ.

30 Claims, 20 Drawing Sheets

(51) Int. Cl.
*C12Q 1/68* (2006.01)
*A61B 5/00* (2006.01)

(56) References Cited

U.S. PATENT DOCUMENTS

2008/0285830 A1* 11/2008 Hong et al. .................. 382/131
2009/0027382 A1   1/2009 Yang et al.

OTHER PUBLICATIONS

International Written Opinion for International Application No. PCT/US2011/022285 mailed on Mar. 29, 2011.
First Office Action for Japanese Patent Application No. 2012-550199 mailed on Sep. 30, 2014.

* cited by examiner

F I G. 3(a)
F I G. 3(b)
F I G. 3(c)
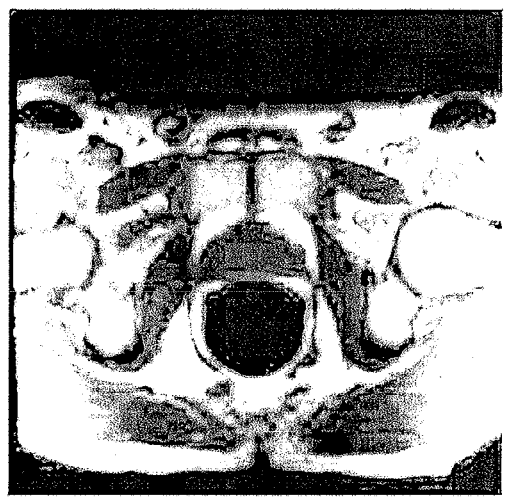
F I G. 3(d)

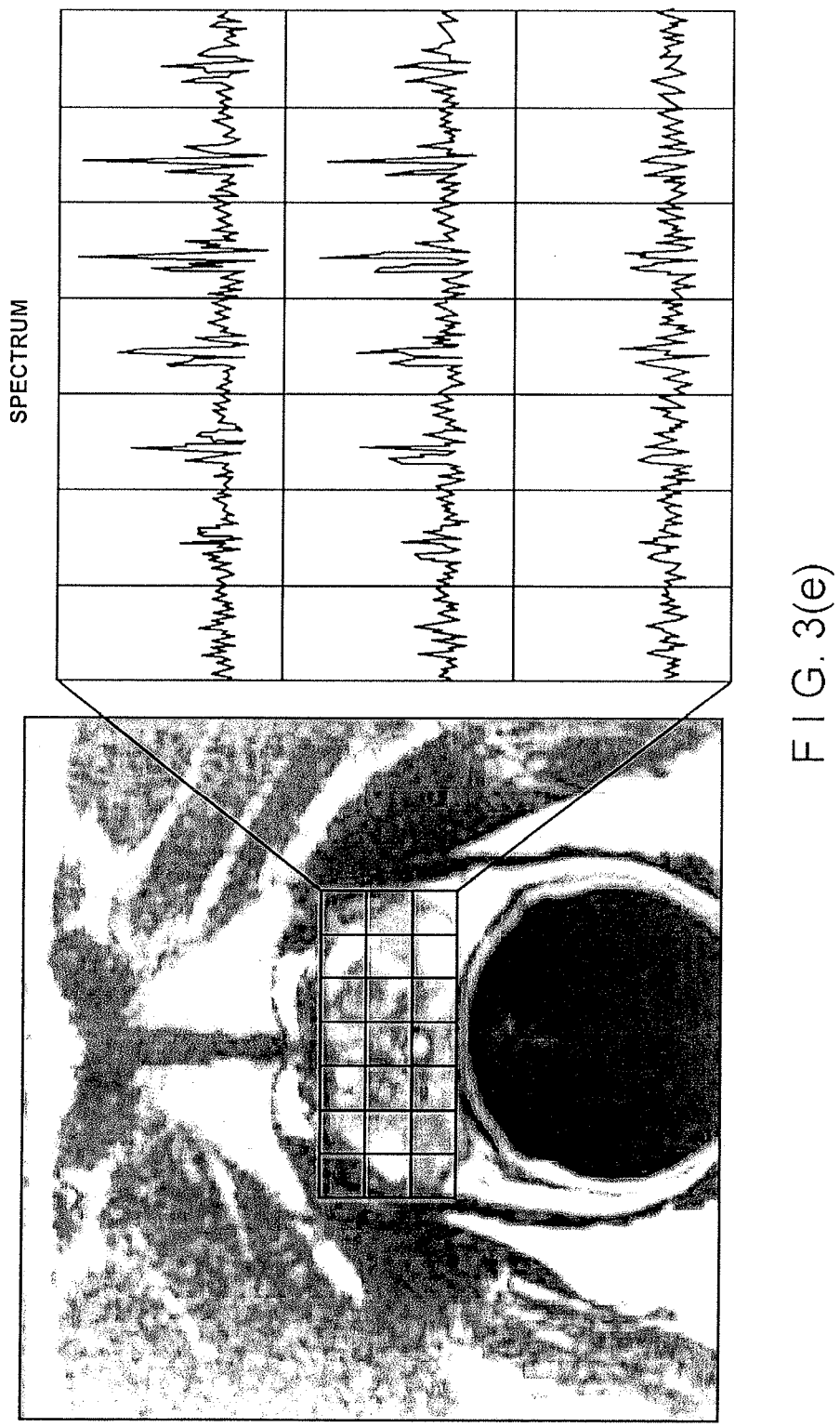
F I G. 3(e)

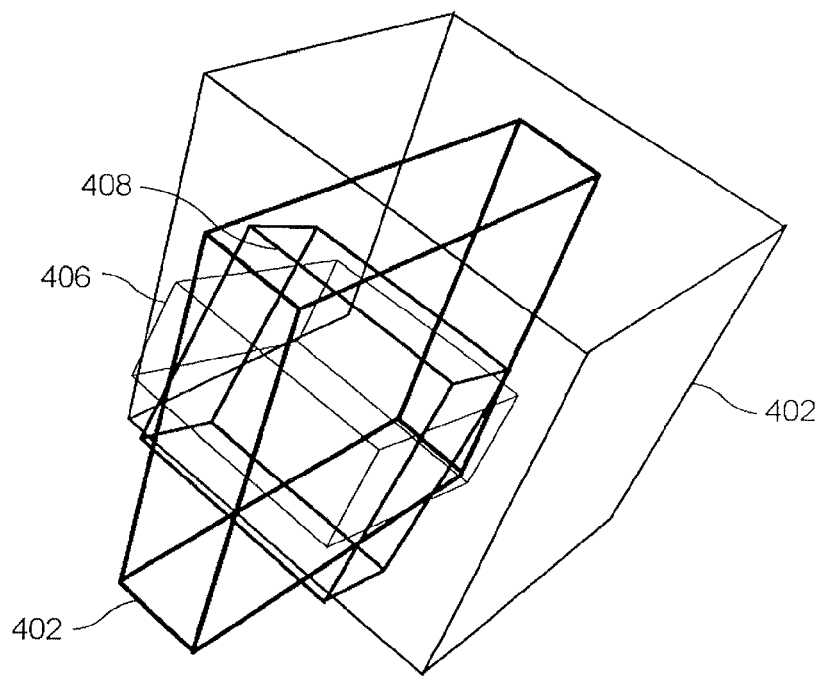
F I G. 4(a)
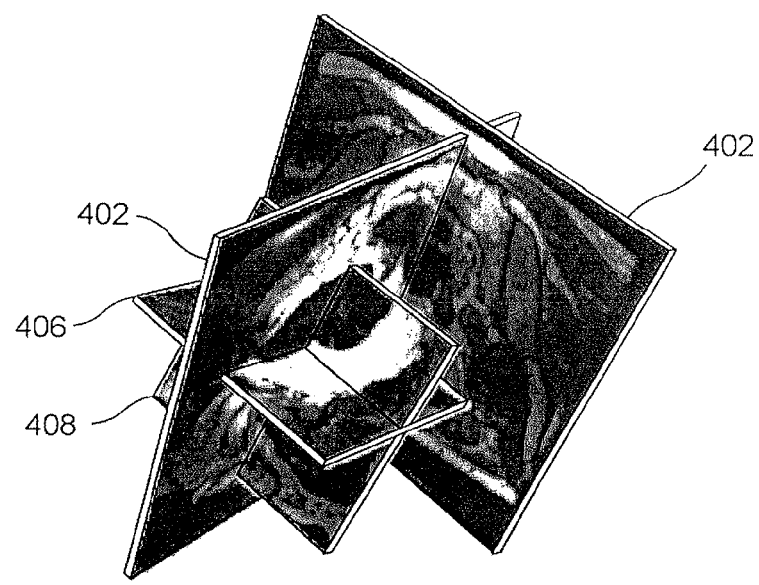
F I G. 4(b)

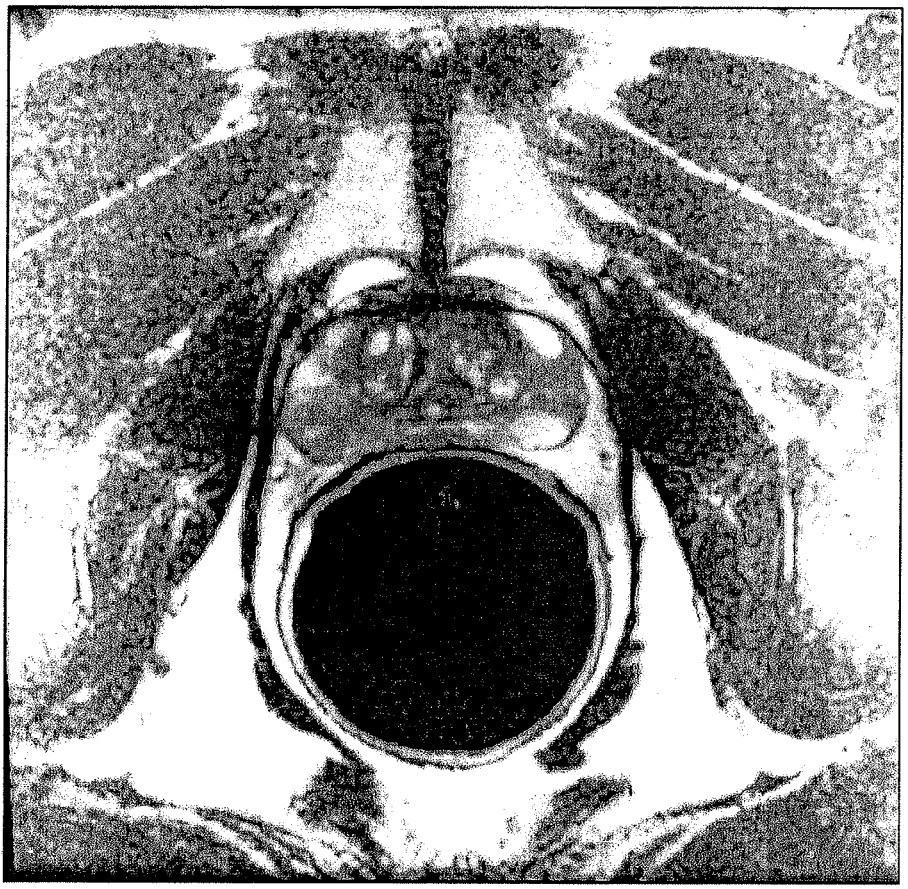
F I G. 5(a)
F I G. 5(b)

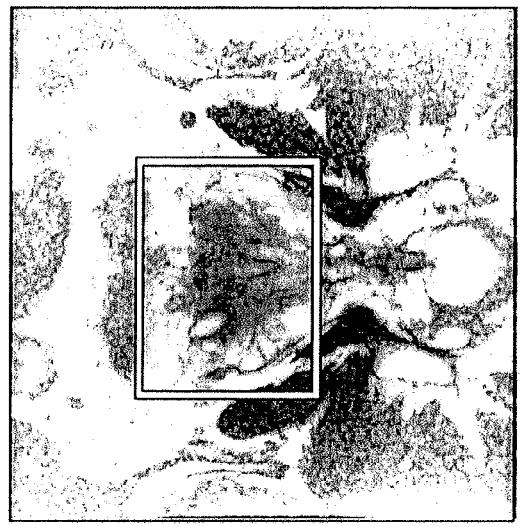
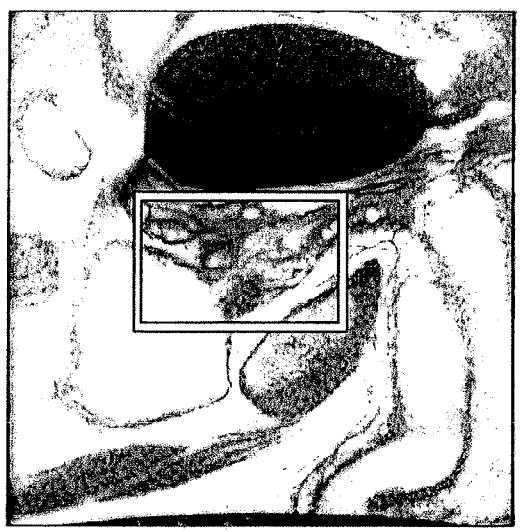
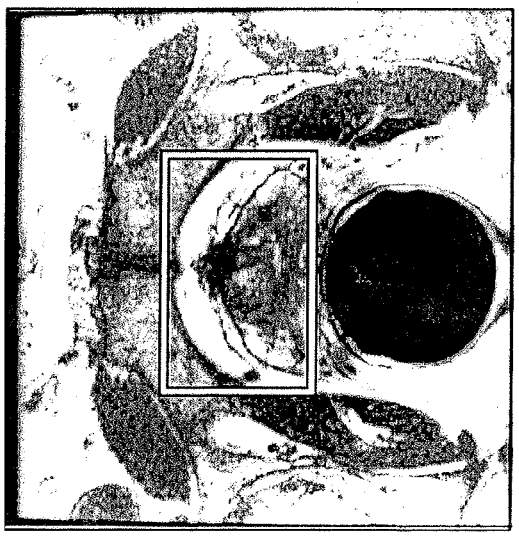
FIG. 8(a) $T_2$-weighted endorectal axial slice
FIG. 8(b) $T_2$-weighted endorectal sagittal slice
FIG. 8(c) $T_2$-weighted endorectal coronal slice

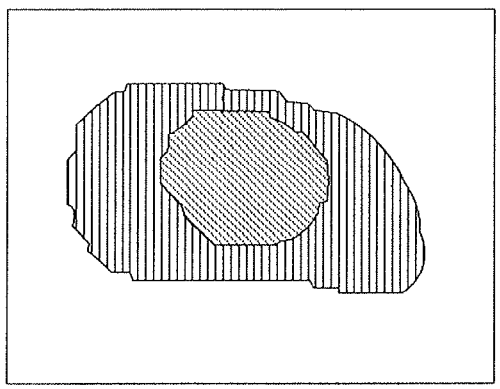
F I G. 9(a)
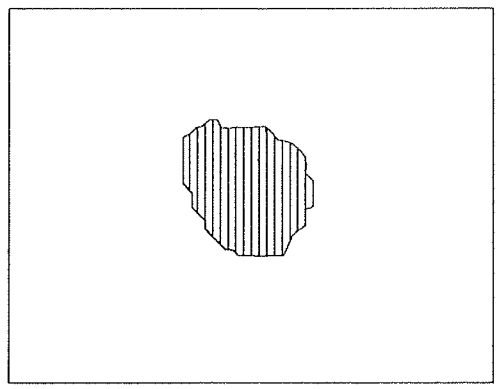
F I G. 9(b)
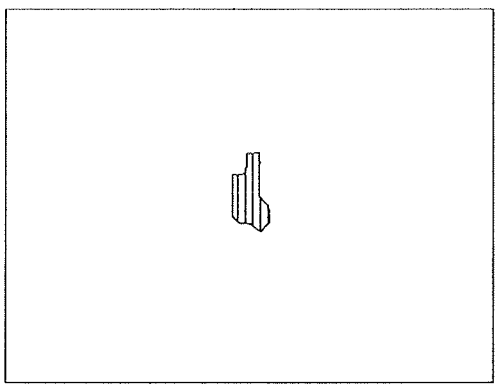
F I G. 9(c)
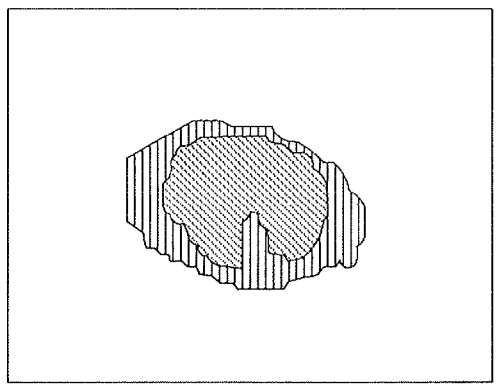
F I G. 9(d)

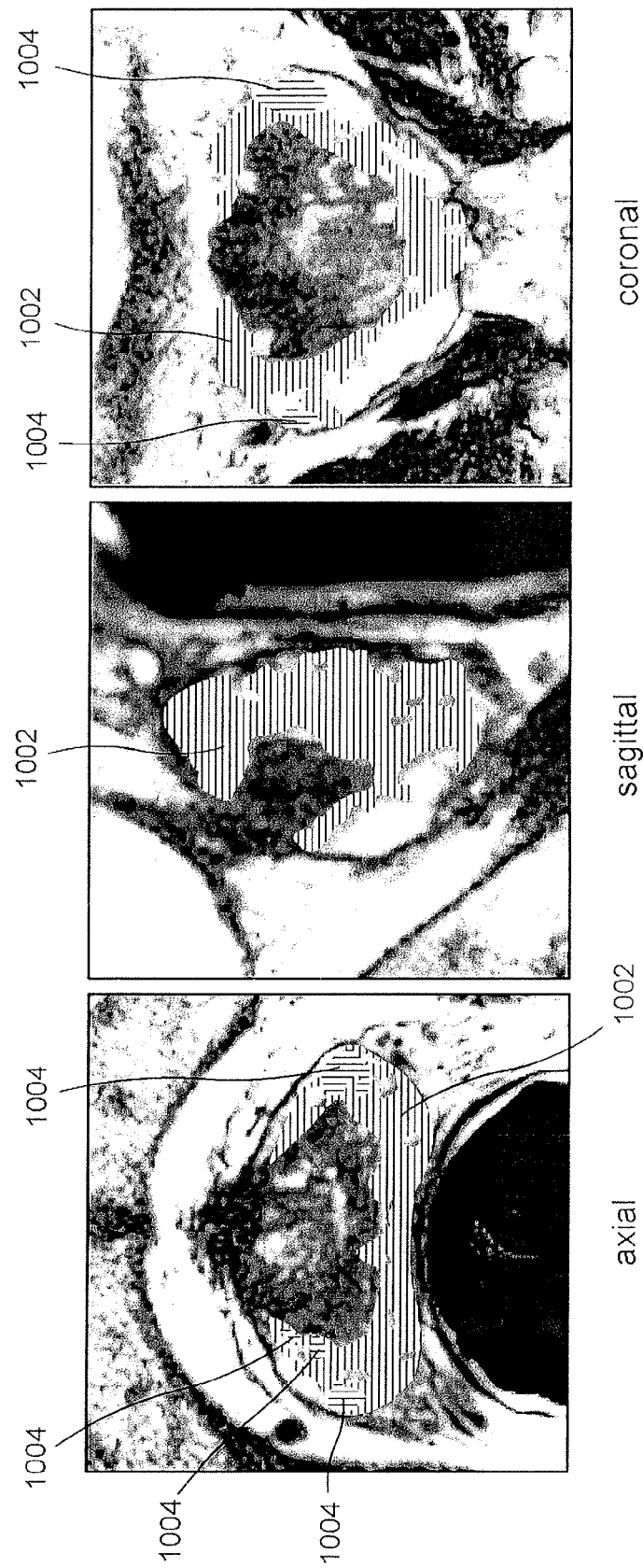

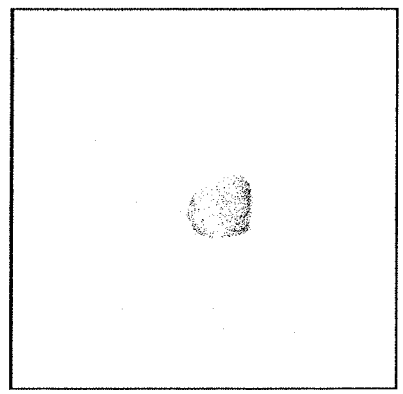
FIG. 17(a) 19 fps
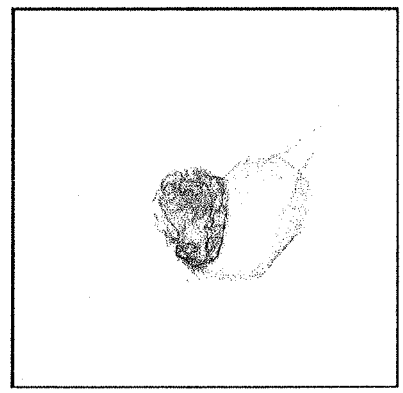
FIG. 17(b) 33 fps
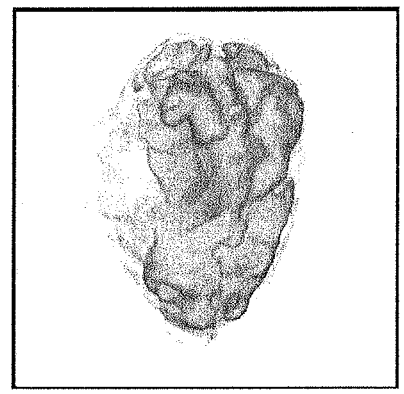
FIG. 17(c) 31 fps
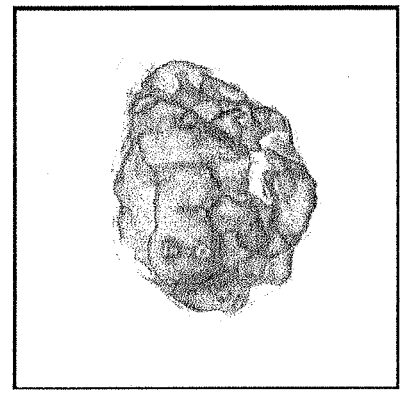
FIG. 17(d) 23 fps

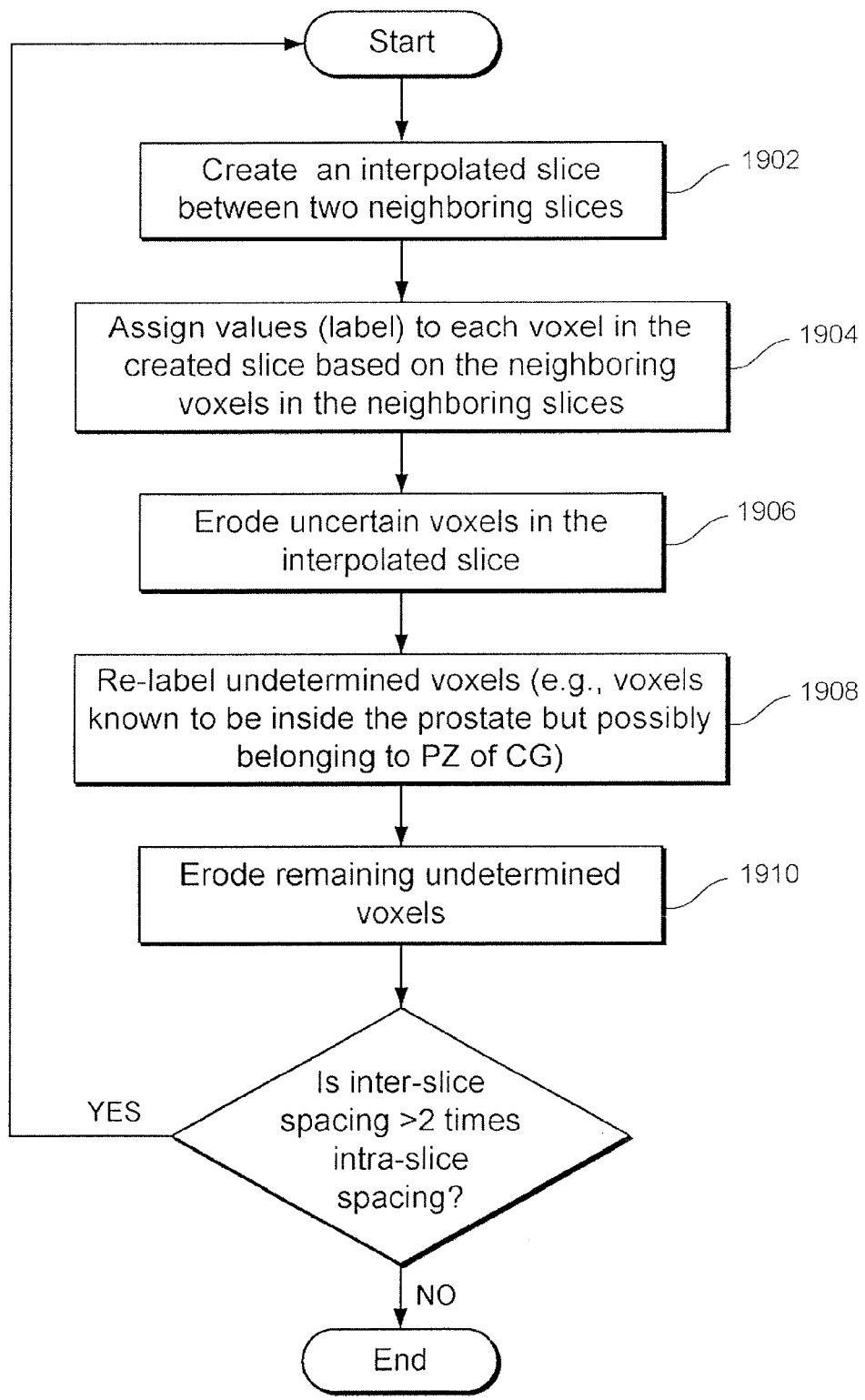
F I G. 19

F I G. 20(a)
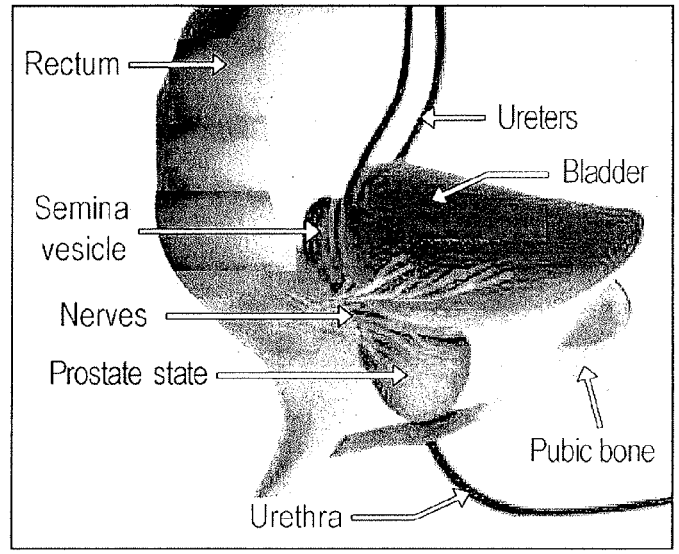
F I G. 20(b)
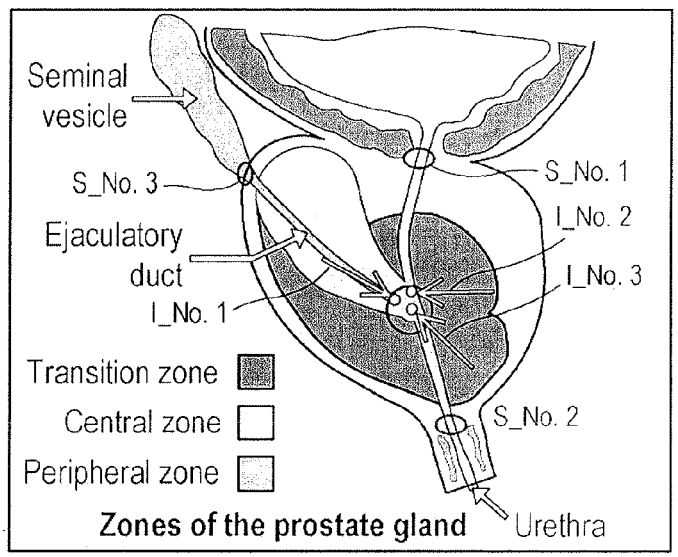
F I G. 20(c)
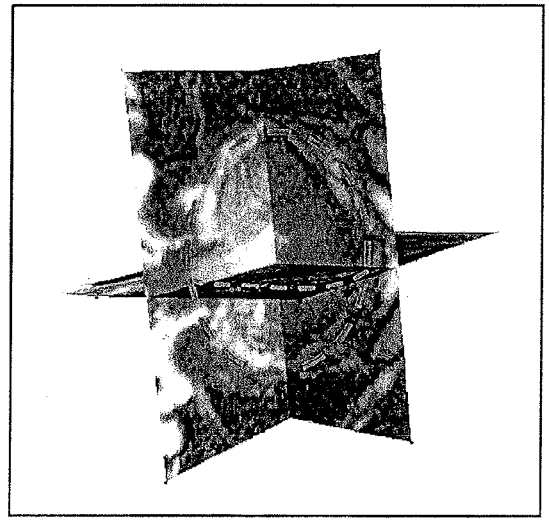

SYSTEM AND METHOD FOR PROSTATE VISUALIZATION AND CANCER DETECTION

CROSS-REFERENCE TO PRIOR APPLICATIONS

This present application relates to and claims the benefit of priority from International Patent Application No. PCT/US2011/022285 filed on Jan. 24, 2011, and from U.S. Provisional Patent Application Ser. No. 61/297,454 filed on Jan. 22, 2010, the entire disclosures of which are incorporated herein by reference in their entireties.

STATEMENT REGARDING FEDERALLY SPONSORED RESEARCH

The invention was made with government support under grant number R01EB7530 awarded by the National Institutes of Health and grant number IIS0916235 awarded by the National Science Foundation. The government has certain rights in the invention.

FIELD OF THE DISCLOSURE

The present disclosure relates to medical imaging, and more specifically to imaging for the diagnosis of prostate cancer (CaP).

BACKGROUND

Prostate cancer (CaP) is the most commonly diagnosed cancer among males in Europe, and is the second leading cause of cancer related mortality for this same group. Although it is such a common cancer, diagnosis methods remain primitive and inexact. Detection relies primarily on the use of a simple blood test to check the level of prostate specific antigen (PSA) and on the digital rectal examination (DRE). If an elevated PSA level is found, or if a physical abnormality is felt by the physician during a DRE, then biopsies will be performed. Though guided by transrectal ultrasound (TRUS), these biopsies are inexact, and large numbers are often necessary to try and retrieve a sample from a cancerous area. More recently, it has been noted that magnetic resonance imaging (MRI) can be used for the detection of CaP. Multiple MR images obtained with different settings are necessary for the detection of CaP. Most commonly used is a combination of T2-weighted and T1-weighted image sequences.

T2-weighted images are generally used to locate regions suspected of being cancerous, while T1-weighted images are used to discount false positives, primarily due to the presence of post-biopsy hemorrhage. The use of MR spectroscopic imaging (MRSI) has also been suggested. Further details on the medical background of using MR T2-weighted, T1-weighted, and MRSI images to detect CaP is described in further detail herein below.

MRSI measures chemical spectra in large regions covering many voxels. For CaP detection, there are three chemicals of interest: choline, creatine, and citrate. Specifically, the ratios of choline to creatine and of choline plus creatine to citrate appear elevated in regions containing CaP. MRSI is not considered suitable for specific localization due to its coarse resolution, but can be useful for a broad overview of regions.

The acquisition of prostate MR image sequences is often done with varying orientations and resolutions per sequence. In cases where the image sequences are acquired during a single session, and without patient movement, the resulting volumes will be naturally registered in world space. Using the image position, orientation, and resolution information of each MRI slice, the volumes can be oriented properly in 3D space without the need for registration methods. Radiologists will typically examine this data by simply viewing the 2D slices, and trying to correlate matching positions between scans in various orientations (e.g., axial and coronal). However, this process is unintuitive and inefficient. A 3D rendering system, which would allow the physician to view the entire gland at once with the visualization including the data from each scan, would be more intuitive and efficient.

The surrounding anatomy can also be important in identifying CaP. Located superior to the prostate are seminal vesicles (SV), the invasion of which by CaP can also be of concern. Invasion of the SVs can be identified using the T2-weighted images. Normal SVs appear as regions of increased intensity surrounded by walls of decreased intensity. In SV invasion, the SVs will appear with decreased intensity throughout. An abnormal angle between the prostate and the rectum can also be indicative of a problem, and thus it is important to be able to view the location of the rectal wall.

Further, multi-modal visualization is well suited to volumetric medical imaging data and growing in popularity due to the proliferation of various 3D medical imaging acquisition devices. The main task for multi-modal rendering is deciding how the volume data should be mixed. Often, the multimodal rendering is used to combine two volumes where one includes structural data and the other includes functional data. In such cases, the two volumes are generally considered separately, with the functional data being used to highlight areas of interest on the structural data. For cases with two modes, a 2D transfer function can be utilized to map a pair of sample values to a specified output color.

Volume rendering using ray casting has become a standard technique, and its highly parallel nature lends it naturally to acceleration on the graphics processing unit (GPU). For GPU accelerated multi-volume rendering, work has often focused on slice-based approaches, where the slices from multiple volumes can be simply interleaved during rendering. For rendering via ray casting, it is common to use depth peeling and perform the ray casting in multiple passes or to do only certain portions at one time. Methods where the ray casting occurs in a single pass typically require the volume datasets to be preprocessed such that they are registered and re-sampled to a single grid. Methods have also been developed which address the problem of memory management for rendering large volumes which cannot fit in memory. However, the problem of memory management is typically not a significant issue for prostate rendering, as the region of interest is small.

SUMMARY OF EXEMPLARY EMBODIMENTS

MR images can assist in the detection of CaP, although slice-based viewing can be difficult. Embodiments of the present disclosure can provide an exemplary method for volume rendering of prostate MR data in an easy and efficient manner, allowing for the user to easily observe the prostate and suspicious regions in 3D. Further, computer aided detection (CAD) techniques can be applied to the rendered prostate volume data to assist in the detection of CaP. The exemplary method can be applicable when multiple datasets have been acquired during the same imaging session, with no patient movement between acquisitions, allowing for the data to be naturally registered in world space. To handle the multi-oriented and multi-resolution volumes, the exemplary method can include an exemplary multi-volume ray casting algorithm wherein the ray integration is performed in a single pass.

Although the exemplary method is optimized for rendering the prostate, it can be applicable to other multi-volume rendering scenarios.

Exemplary embodiments of the present disclosure can provide a method, apparatus, and computer readable medium to perform 3D rendering, allowing a physician to view the entire gland with visualization including data from multiple scans using multi-volume ray casting with multi-modal shading. First, the image information can be extracted from the raw Digital Imaging and Communications in Medicine (DICOM) slices. Segmentation of the prostate region and trimming can be performed on the volume to remove extraneous data. After this, three boundary pre-passes through the volumes' geometric data can be performed. The results from these pre-passes can then be used to perform multi-volume ray casting in a single pass through the data. The shading during this ray casting pass is preferably accomplished using a multi-modal shading scheme which considers T2-weighted image data, T1-weighted image data, and MRSI spectral data. The output of this pass can be the final rendered image, which the user can optimize by adjusting threshold parameters to control to the multi-modal shading or by modifying the view.

Embodiments of the present disclosure can also include a method of classification for multi-modal MR rendering of the prostate that takes into account T2-weighted, T1-weighted, and MRSI volumes. Unlike many other multi-modal rendering applications, the values from the modes are used in deciding how a region is to be shaded, rather than simply using one functional mode to highlight something from a structural mode. The exemplary classification can be formulated as an equation which can be efficiently computed. The exemplary multi-volume ray casting and multi-modal classification methods can be implemented on a GPU and optimized for such an architecture.

Embodiments of the present disclosure can also include a framework for the visualization of the prostate, its surrounding anatomy, and indications for tumor and hemorrhage location within the gland. To provide for this visualization, an exemplary score volume for rendering the multi-modal data can be provided. The score volume can be first created for the gland and seminal vesicles which takes into account three T2-weighted datasets, a T1-weighted dataset, and an MRSI dataset. Based on thresholds, every voxel can be scored as to whether each MR mode indicates a point of interest. This score volume can be integrated into a slice-based viewing approach, or applied for 3D visualization of the region.

The prostate, the score volume, and the surrounding anatomy can be visualized in an interactive framework which allows the user to adjust the content being viewed. Various view modes of the score volume are possible so that the user can focus on the desired results. An aspect of the present disclosure can include a visibility persistence mode, allowing one score to remain visible when it would otherwise be occluded. The volume rendering can use a single pass multi-volume ray caster which is accelerated on the GPU to provide interactive performance.

Whereas previous 3D visualizations of the prostate have focused on displaying its shape, exemplary embodiments allow the user to view multiple types of information for the interior of the gland. This multi-modal information can be viewed as desired by the user. The use of a score volume for volume rendering can be generalizable to any CAD application, as the exemplary method of determining the scores can be separate from the rendering.

According to exemplary embodiments of the present disclosure, up to six values can be considered at each sample point. A 6D transfer function to incorporate these values may be used, but can be difficult to design. As an alternative to this approach, a formula into which the values can be placed is described herein below. The resulting value from the computation of this formula can then be used to map the sample to color.

Further exemplary embodiments of the present disclosure can also store the volume information in GPU memory and perform the ray casting within a single pass without the need to resample the volumes to a unified grid, allowing each volume to retain its native local coordinate system, resolution, and unfiltered quality.

Yet another exemplary embodiment of the present disclosure can provide a method for performing upsampling of prostate volumes based on ternary labelmaps, where the volume is segmented into the peripheral zone (PZ) and the central zone (CZ), and non-prostate regions. This exemplary upsampling can be based on using three orthogonal T2-weighted image sequences (axial, sagittal, and coronal). The first part of the algorithm upsamples each volume individually by interpolating labelmap slices as needed. Given these three upsampled volumes, the second part of the algorithm can combine them to create a composite upsampled volume, which can give a representation of the prostate. This exemplary technique can be implemented in prostate visualization techniques to create accurate and visually pleasing volume rendered images.

An exemplary embodiment of the present disclosure can provide a method for detecting a disease of a prostate. The exemplary method can include receiving an image dataset acquired with at least one acquisition mode; segmenting a region of interest including the prostate from the dataset; applying conformal mapping to map the region of interest to a canonical shape; generating a 3D visualization of the prostate using the canonically mapped dataset; and applying computer aided detection (CAD) to the canonically mapped volume to detect a region of disease of the organ. The disease can include a cancer, and the dataset can include a plurality of datasets acquired with at least two different acquisition modes.

The exemplary method can also include registering the plurality of datasets and correlating the plurality of datasets, and the conformal mapping can include the use of texture analysis.

According to the exemplary method, the computer-aided arrangement can include an electronic biopsy.

Another exemplary embodiment of the present disclosure can provide a method for volume rendering of an organ. The exemplary method can include receiving a plurality of datasets acquired with at least two acquisition modes; segmenting the plurality of datasets to define a region of interest; executing a multi-volume ray casting algorithm; performing multi-modal shading; processing the plurality of datasets using the boundary pre-passes and the multi-volume ray casting algorithm; generating an image of the organ using the processed plurality of datasets; and detecting a disease of the organ using a computer-aided arrangement. The plurality of datasets can include at least one of a T2-weighted endorectal axial scan; a T2-weighted endorectal sagittal scan; a T2-weighted endorectal coronal scan; a T1-weighted pelvic axial scan; and a MRSI, and the segmenting can include manually segmenting at least a portion of the plurality of datasets. Further, the multi-volume ray casting algorithm can include a single pass performing a ray casting via a single traversal or a plurality of boundary pre-passes configured to identify at least one of a direction for each ray and a step size for each ray. The plurality of boundary pre-passes can identify at least one of a starting position in world space for each ray and a starting position in local space for each ray.

The exemplary method can further include upsampling at least a portion of the plurality of datasets to create an upsampled volume, and generating the image using the upsampled volume. The upsampling can include creating an interpolated slice between two neighboring slices, labeling at least some voxels of the interpolated slice, eroding at least some voxels labeled as undetermined or uncertain.

The exemplary method can further include extracting the plurality of datasets and combining images to form a plurality of volumes. Extracting the datasets can include aligning the volumes in a world space. The exemplary method can further include scoring the volumes to facilitate a diagnosis of a disease. The exemplary method can also include classifying at least portions of the generated image as at least one of cancerous or normal, which can also include scoring at least a portion of the processed dataset.

According to an exemplary embodiment, the organ can be a prostate and the disease can be a cancer.

According to another exemplary embodiment, the exemplary method can include creating a score volume including at least one score, each score associated with at least one of T2-weighted images, T1-weighted images, or MRSI images. Further, the image can be generated at least partially based on the score volume.

The exemplary method can further include processing the plurality of datasets into at least one 3-dimensional texture, and the 3-dimensional texture include a volume cuboid.

Another exemplary embodiment of the present disclosure can include a system for multi-modal volume rendering of an organ. The exemplary system can include an imaging arrangement configured to acquire an image dataset acquired with at least one acquisition mode; and a computing arrangement configured to segment a region of interest including the prostate from the dataset, apply conformal mapping to map the region of interest to a canonical shape, generate a 3D visualization of the prostate using the canonically mapped dataset, and apply computer aided detection (CAD) to the canonically mapped volume to detect a region of disease of the organ.

Yet another exemplary embodiment of the present disclosure can provide a non-transitory computer readable medium including instructions thereon that are accessible by a hardware processing arrangement, wherein, when the processing arrangement executes the instructions. The processing arrangement can be configured to receive an image dataset acquired with at least one acquisition mode; segment a region of interest including the prostate from the dataset; apply conformal mapping to map the region of interest to a canonical shape; generate a 3D visualization of the prostate using the canonically mapped dataset; and apply computer aided detection (CAD) to the canonically mapped volume to detect a region of disease of the organ.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 3(a)-(e) are images of exemplary sample slices from five image sequences in a data set according to exemplary embodiments of the present disclosure;

FIGS. 4(a) and (b) are exemplary illustrations of four image volume sequences having different orientations according to exemplary embodiments of the present disclosure;

FIGS. 5(a) and (b) are exemplary sample images before and after image trimming according to exemplary embodiments of the present disclosure;

FIGS. 8(a)-(c) are exemplary sample slice images obtained using to exemplary embodiments of the present disclosure;

FIGS. 9(a)-(d) are exemplary ternary labelmap interpolation images according to exemplary embodiments of the present disclosure;

FIGS. 11(a)-(c) are exemplary images of integrating a score volume according to exemplary embodiments of the present disclosure;

FIGS. 17(a)-(d) are exemplary images showing different types of rendering according to exemplary embodiments of the present disclosure;

FIG. 19 shows an exemplary flow diagram of an exemplary method according to exemplary embodiments of the present disclosure; and FIGS. 20(a)-(c) show illustrations of an exemplary prostate feature detection according to exemplary embodiments of the present disclosure.

Figure 1:
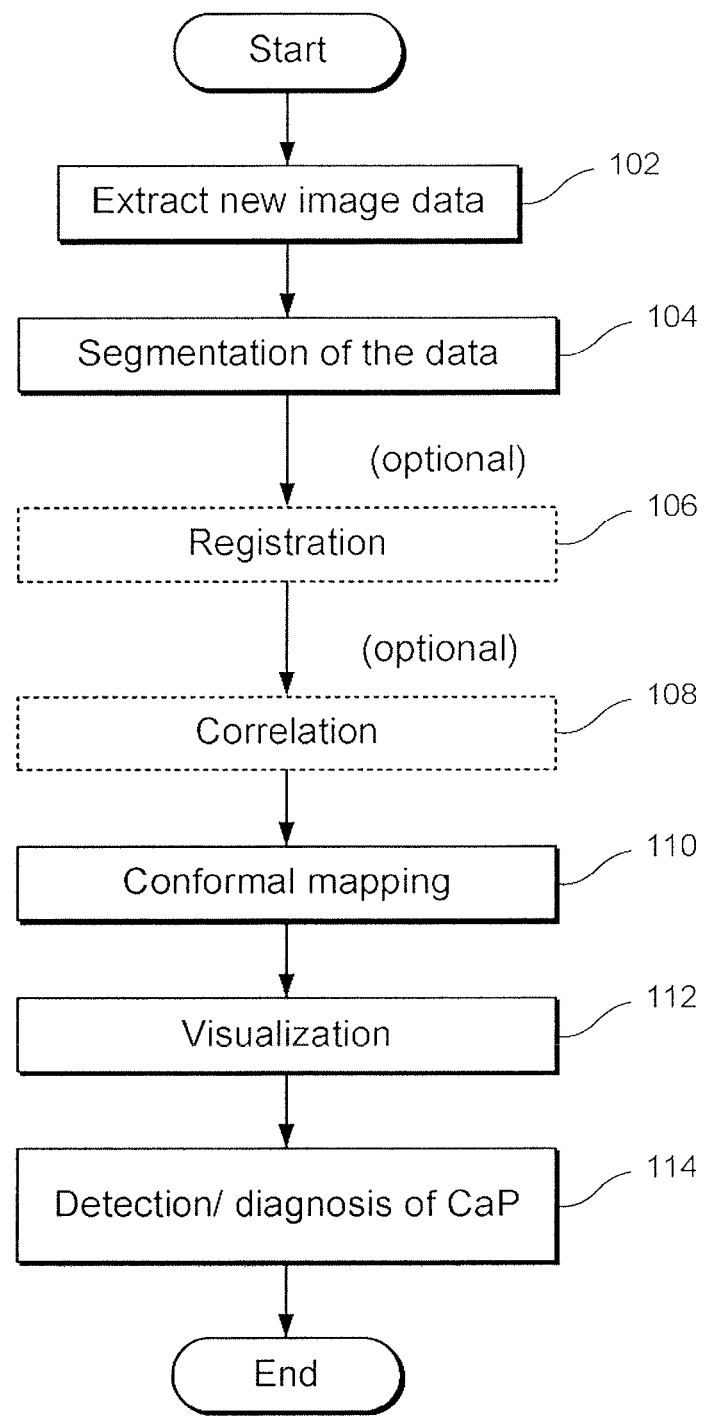
FIG. 1 is a block flow diagram of an exemplary method according to exemplary embodiments of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures.

DETAILED DESCRIPTION OF EXEMPLARY EMBODIMENTS

The present disclosure relates to imaging and volume rendering of organs, such as the prostate. The present methods generally employ multi-modal imaging in order to enhance performance. According to exemplary embodiments of the present disclosure, multi-modal image data may be acquired by a single imaging device and can be used to obtain both the anatomical information as well as the cancerous regions. Rather than relying on a single scan to identify the cancer, multi-modal rendering can also be used to not just combine two items together (cancer and anatomy), but to identify the suspicious regions.

As shown in FIG. 1, an exemplary embodiment of the present disclosure can provide an exemplary method, apparatus, and computer readable medium to perform segmentation, visualization, and computer-aided detection (CAD) of CaP. Exemplary embodiments of the present disclosure can also provide registration and correlation of multi-modal data.

In an exemplary embodiment, image data, such as, e.g., DICOM slices, can be extracted (102). Next, the data can undergo a segmentation process (104) to isolate the prostate volume from surrounding tissue. The data may be manually segmented, automatically segmented, semi-automatically segmented, or some combination thereof. The segmentation 104 can, for example, differentiate between prostate and non-prostate tissue, and also between the PZ and CG. Optionally, when certain multi-modal data is employed, it may be preferable for the data sets to be registered (106) and correlated (108). Multi-modal data can include image data acquired with different protocols, images taken at different times, and the like. The registered and correlated data set can be used, for example, for subsequent 3D visualization and rendering and identification of CaP.

Various methods of data, image and volume set registration may be suitable for use in the present methods. As one illustrative example, registration can be performed using anatomical feature points. FIGS. 20(a)-(c) show exemplary images that can be used for prostate feature detection. FIG. 20(a) shows the anatomical position of the prostate. FIG. 20(b) shows each feature point with the pre-defined index number is highlighted. FIG. 20(c) shows an exemplary multi-view of a prostate MR image along three directions. The prostate, a gland like a walnut in size and shape, typically does not contain a complicated geometric structure. The prostate gland, which typically surrounds the urethra, is typically located in front of the rectum, and just below the bladder.

For volumetric feature registration, it is preferable to match at least three anatomical features within the MRI images of different directions to obtain an accurate and reliable registration result. A pair of glands called the seminal vesicles are typically tucked between the rectum and the bladder, and attached to the prostate as shown in FIG. 20(a). The urethra goes through prostate and joins with two seminal vesicles at the ejaculatory ducts. Therefore, some distinctive anatomical structures, such as the prostatic capsule and seminal vesicle contours, dilated glands, and ejaculatory ducts as represented in FIG. 20(b), can be applied for the exemplary registration process between different scan directions of one dataset or between MR slices and histology maps. This can also be used to register various sets of image data, such as MRI, CT, PET, SPECT and other image scan data, should such multi-modal image data be of interest.

MRI can provides images with excellent anatomical detail and soft tissue contrast. T1, T2-weighted datasets along the axial, sagittal and coronal view as shown in FIG. 3(c) can be analyzed. On each MRI prostate view direction, the exact outline of prostate boundary can be traced and each corresponding feature point can be manually marked with the predefined index number. MRI sequences are displayed in a serial order. Typically, two kinds of feature point can be used, e.g.: three internal feature points from the ejaculatory ducts (dilated gland inside the prostate), which can be the intersection of urethra and two seminal vesicles; and four surface feature points also from the extra information of urethra and seminal vesicles. Because the urethra goes through the entire prostate, two surface feature points can be the entrance and exit points of the urethra. Meanwhile, with respect to the fact that two seminal vesicles attach to the prostate and merge with urethra at the ejaculatory ducts, another two surface points can be marked at the intersection between each seminal vesicle and prostate.

The exemplary method can further include conformal mapping of the prostate (110). For example, the surface of the prostate can be mapped to a surface of a canonical geometric shape, such as a hollow sphere or cuboid, or the prostate volume can be mapped to a solid sphere. Alternatively, since CaP is typically located in the PZ and near the surface, conformal mapping of the prostate surface with some thickness to a sphere with a thick shell may be preferred. The conformal map can also aid in registration of the data. The use of "texture analysis" on the voxels of the prostate volume can be used to code the mapped surface image, such as by applying different colors to those voxels which have differing likelihood of CaP. Clustering of the coded image, such as by grouping regions having similar voxel values or colors, can be used in CAD processes to allow a user to quickly identify regions where CaP is likely.

Further, the data can be used to perform visualization of the prostate (112). The visualization can include multi-modal 3D rendering of the prostate, or could also be provided on the conformal map. This can include T1-weighted, T2-weighted, and MRSI data. Further, the visualization can include translucent rendering views that can facilitate "electronic biopsies." For example, an exemplary electronic biopsy technique can include rendering a translucent volume onto a spherical shell and applying a transfer function expressly designed to map prostate tissue so that healthy tissue can be differentiated from cancerous tissue. Additionally, CAD techniques, such as the "electronic biopsy" or clustering algorithms, can be used for the diagnosis of CaP (114).

Other exemplary embodiments of the present disclosure can provide an exemplary method, apparatus, and computer readable medium to perform 3D rendering of the prostate gland with visualization including data from multiple scans using multi-volume ray casting with multi-modal shading. Steps of the exemplary method for rendering the prostate system is shown, for example, in FIG. 2. First, the image information can be extracted from raw data, such as, e.g., raw DICOM slices, (process 202). Segmentation of the prostate region and trimming can be performed on the image volume to remove extraneous data (process 204). After this, boundary pre-passes through the volumes' geometric data can be performed in process 206. For example, three boundary pre-passes may be used. The results from these pre-passes can then be used to perform multi-volume ray casting in a single pass through the data in process 208. The shading during this ray casting pass is preferably accomplished using a multi-modal shading scheme which considers T2-weighted image data, T1-weighted image data, and MRSI spectral data. The output of this pass can be the final rendered image (210), which the user can optimize by adjusting threshold parameters to control the multi-modal shading or by modifying the view (processes 212, 214, 216).

The present system can provide the user an indication of the suspicious locations in 3D space, allowing the user to quickly tell where such regions are in the entire prostate volume without the need to scroll through several individual 2D slices. Rather than attempt to make a voxel-level determination, the current system can be used as a tool to assist the user in finding regions of voxels that are suspicious and guide them to those areas that warrant further inspection.

Medical Background

To understand further about the development of a 3D multimodal visualization system to assist in the detection of CaP, a brief description of the zonal anatomy of the prostate and the relationship of the three MR modes utilized is described. Examples of the types of images produced by these modes are shown in FIG. 3. FIG. 3(a) shows an exemplary T2-weighted endorectal axial slice. FIG. 3(b) shows an exemplary T2-weighted endorectal sagittal slice. FIG. 3(c) shows an exemplary T2-weighted endorectal coronal slice. FIG. 3(d) shows a T1-weighted pelvic axial slice. FIG. 3(e) shows an MRSI slice.

The prostate is divided into three zones, referred to as the peripheral zone (PZ), transitional zone (TZ), and central zone (CZ). The TZ and CZ are often considered together as a single region in contrast to the PZ, and as such are referred to as the central gland (CG). The PZ is the largest of the three zones, accounting for approximately 70% of the prostate, while the TZ and CZ each account for approximately 25% and 5%, respectively. It is therefore unsurprising that the PZ is also the most common location for CaP to occur, with approximately 70% of cases originating there. Being on the periphery of the prostate, cancer from this region is also more likely to quickly spread beyond the prostatic capsule. The CG is considered of relatively low importance compared to the PZ, and thus in the present disclosure the focus is on detecting CaP in the PZ.

T2-weighted images provide good image quality of the prostate gland, allowing for a differentiation between the PZ and CG. For normal prostatic tissue, the PZ will typically demonstrate high signal intensity in the T2-weighted images. In cancerous tissue, the PZ will generally demonstrate a decreased signal intensity. In the CG, however, normal tissue already typically demonstrates a heterogeneous low signal intensity. Cancerous regions there may be detectable as areas of homogeneous low signal intensity. However, embodiments of the present disclosure focus on detecting CaP in the PZ.

Unlike T2-weighted images, T1-weighted images are of low image quality with respect to the prostate and are therefore not generally used to identify cancerous regions. Rather, the T1-weighted images are typically used to exclude regions which may still contain blood from earlier biopsies. Such post-biopsy hemorrhages typically appear similar to cancer in the PZ in T2-weighted images (that is, having a reduced intensity). However, in T1-weighted images, such regions typically have increased intensity from regular prostate tissue, which is of homogeneous low intensity. Cancerous regions are generally not apparent in T1-weighted images, since they also appear as areas of low intensity. MRSI for CaP detection looks at two ratios of chemicals, that of choline to creatine and that of choline plus creatine to citrate. Both of these ratios typically appear elevated in CaP. In MRSI, these chemical spectra can be read in large voxel regions, which are not to be confused with how the regular MR images are considered as voxels for volume rendering. Although usually aligned with the T2-weighted endorectal axial images, MRSI voxels are significantly larger, covering many normal image voxels per slice. An example of the MRSI voxel size can be seen in FIG. 3(e), where the MRSI voxels for the slice are represented by a grid overlay on the T2-weighted image.

Exemplary Data Pre-Processing

The data used can be raw DICOM files. According to an exemplary embodiment of the present disclosure, a standard dataset can be used. For example, a standard dataset can be defined as a dataset which can include the following five image sequences:

1. T2-weighted endorectal axial scan;
2. T2-weighted endorectal sagittal scan;
3. T2-weighted endorectal coronal scan;
4. T1-weighted pelvic axial scan; and For the T2-weighted image sequences, the data can be acquired, for example, with approximately 0.5 mm intraslice and 3 mm interslice resolutions. The T1-weighted images can be acquired at a much coarser resolution, for example, approximately 1 mm intraslice and 6 mm interslice. Examples of each of these image sequences can be seen in FIG. 3.

An exemplary method according to an exemplary embodiment of the present disclosure is described in further detail below.

Exemplary DICOM Extraction

Figure 2:
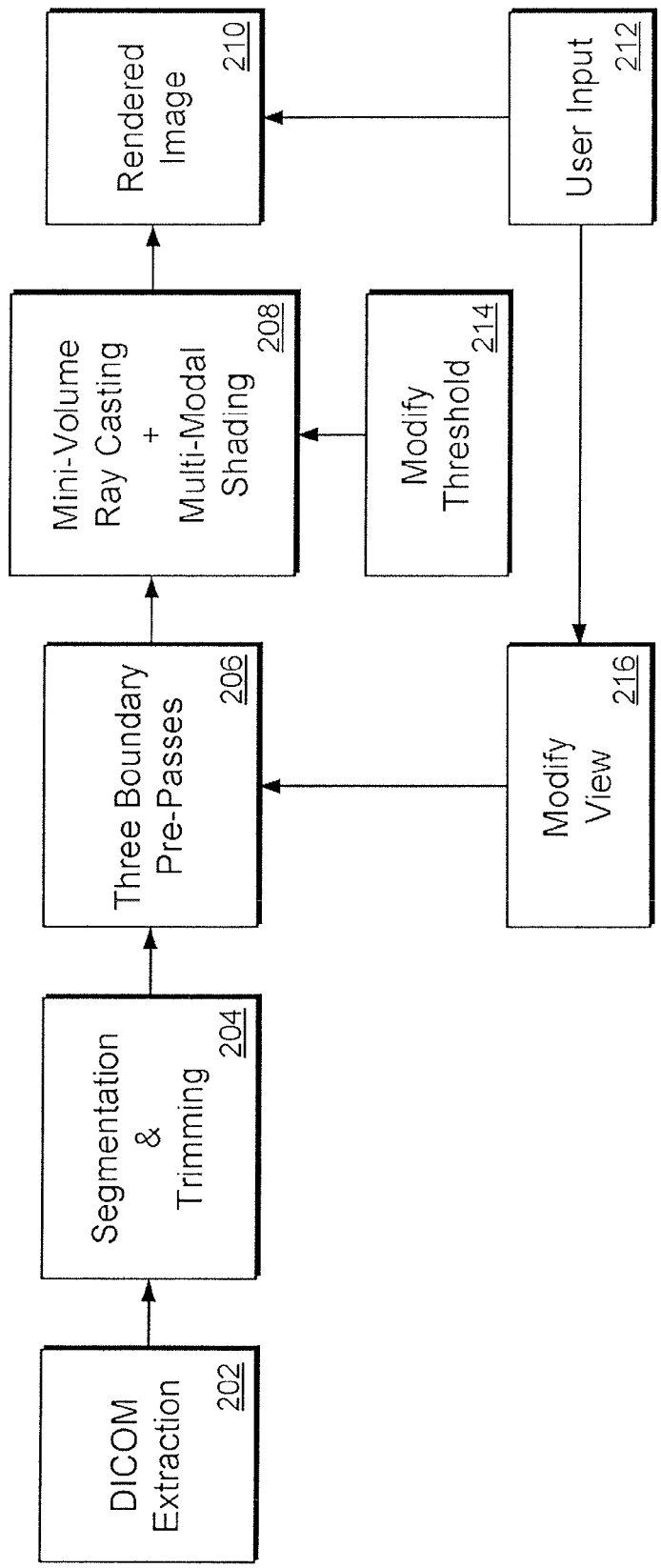
FIG. 2 is a block flow diagram of an exemplary method according to exemplary embodiments of the present disclosure.

As shown in FIG. 2, an exemplary method according to the present disclosure can include data extraction (202). Individual MR slices can be delivered using the DICOM standard, a common format used by medical imaging devices. From these raw DICOM files, images belonging to the same scan can be combined in sequence to form volumes. For each volume, the image position (center of the upper left pixel) of the first slice can be retained from the DICOM header information, as is the image pixel (x- and y-) resolution and orientation. The z-direction resolution can be provided from the slice spacing information, and the z-orientation can be calculated using the image position information from two slices. Using this extracted position, orientation, and resolution information, the volumes can be aligned with each other in world space, negating the need to perform registration on the volumes. In other embodiments of the present disclosure, the image sequences may not be acquired during a single session, or the patient may have moved during the sequences. Accordingly, it may be desirable for these images to be registered in accordance with various registration processes. The orientation relation of the four image volumes can be seen, for example, in FIG. 4. FIG. 4(a) shows an exemplary four image sequence for a data set having different positions, orientations, and resolutions in world space to illustrate each volume extent. FIG. 4(b) shows an exemplary four image sequence for a data set having different positions, orientations, and resolutions in world space to illustrate each center slice.

The T2-weighted and T1-weighted volumes can be straightforward to handle, as they are conventional image data. The MRSI sequence, however, requires some more processing. As shown in FIG. 3(e), the MRSI images can be in a format easily readable by humans, but not in a form ready to be used as a volume for rendering. As noted above, the two ratios of interest in MRSI (e.g., the ratio of choline to creatine and the ratio of choline plus creatine to citrate), can already be calculated and provided above the spectras for each MRSI voxel. These ratio values can be extracted. This extracted volume can then be used in the volume rendering flow shown in FIG. 2.

Exemplary Segmentation

As shown in FIG. 2, the exemplary method can include a segmentation operation (204). For example, manual segmentation can be performed on the T2-weighted axial slices. Although automatic and semi-automatic methods for segmentation of the prostate can be used, since exemplary embodiments of the present disclosure focus primarily on detecting CaP in the PZ, preferably, the PZ and CG are manually segmented as two separate regions. Since this T2-weighted endorectal axial volume is preferably aligned in world space with the other volumes, other segmentations are generally not necessary. Using the segmentation information, the volumes can be trimmed to include the segmented region of interest. The alignment information between the volumes facilitates this to be accomplished on the volumes with a single segmentation. A boundary of approximately 7 mm around the segmented region can be retained to provide some context in case the slices are viewed individually.

This trimming operation can reduce memory requirements and results in increased speed of ray casting because of less non-prostatic space to skip. FIG. 5 shows an example of the size difference between one slice at the original size, with dimensions of 256×256 for a total of 65,536 pixels (FIG. 5(a)), and at the trimmed size, with dimensions of 116×71 for a total of 8,236 pixels (FIG. 5(b)). The total number of voxels present in the exemplary volumes containing these slices was 1,441,792 voxels for the original size volume and 148,248 voxels for the trimmed volume.

Exemplary Multi-Volume Ray Casting

As shown in FIG. 2, an exemplary method according to the present disclosure can include s multi-volume ray casting algorithm (e.g., 206 and 208). The multi-volume ray casting algorithm preferably includes three pre-passes through the scene boundary information, with ray casting performed in a single final pass. Each volume can be traversed by a ray which has its coordinate system local to that volume, but the traversal preferably remains in step with the volumes in the world coordinate system (e.g., a step in one volume is equivalent in world distance to a step in another volume, although the steps within each volume's local system can be different). The three boundary pre-passes facilitate setting the ray directions and step sizes, while the fourth pass can perform the ray casting with a single traversal through the volumes.

Exemplary Boundary Pre-Passes

As shown in FIG. 2, an exemplary method according to the present disclosure can include a boundary pre-pass (206). In a certain example, three pre-passes through the geometric boundary data can be used to obtain the positional, directional, and stepping information along each ray for each volume. These passes can be done as pre-processing, and can be repeated when the view or volume location in world space changes. Changes in a transfer function or other shading parameters can be performed with a single ray casting pass. The first pre-pass, e.g., a bounding front pass, can identify the starting position in world space for each ray. For each pixel in the image plane, this position can be the volume position (considering the volumes being rendered) which is closest to the image plane along the ray through the pixel. The outputs from this pass (the world starting position for each ray) can be used in the third pass. The second pre-pass, e.g., a per-volume front pass, can identify the starting position in world and local space for each individual volume along each ray. Similarly to the bounding front pass, for each pixel in the image plane, the closest position in each volume to the image plane along the ray through the pixel can be calculated. The outputs from this pass can be, for each pixel, the local and world entry positions for each volume. These can be used in the third pass. The third and final pre-pass, e.g., a per-volume back pass, can identify the starting position and ray direction for each ray in local space, as well as the number of steps from the starting position until the volume is entered and the number of steps from the starting position until the volume is exited.

The third pass can use the outputs from the two previous passes (bounding front pass and per-volume front pass). For this third pass, the furthest position along each ray for each volume can be calculated, and used together with the closest position information from the previous pass to obtain the ray direction in local space. Using the information from both previous passes, the distance in local and world space from the boundary starting position to the beginning and end of each volume can be calculated. Using this distance information along with the calculated ray directions, the ray starting position in local space can be calculated such that each ray will start at the same location in world space, although it might be outside of its corresponding volume. The ray direction can be multiplied by the ratio of the distance in local space to the distance in world space in order to ensure that a step along each ray is the same in world space. The number of steps along the ray until the volume is entered and until the volume is exited can then be calculated.

Exemplary Ray Casting Pass

An exemplary method according to the present disclosure can include a ray casting pass (208). From the output of the final pre-pass, for each volume, every ray for every pixel in the image plane preferably has a starting position in local space, a ray direction in local space, the number of steps until the volume is entered, and the number of steps until the volume is exited. Since the ray start positions and steps are preferably calibrated, the rays remain at consistent positions in world space at each step, and thus the sample positions along each ray at each step remain consistent in the world coordinate system. Although it is possible to step along the rays in the world coordinate system, that typically requires a costly conversion at each step to each volume's local coordinate system. By stepping in the local coordinate systems to begin with, this costly operation can be avoided. Since each ray is not inside of its volume the entire time from the ray starting point until termination, it is preferable to check whether or not this property is true before attempting to sample the volume. Since the information for the number of steps until the volume is entered and the number of steps until the volume is exited is known, at each iteration the number of steps traversed can be checked to confirm it is within these two bounds. If so, the corresponding volume can be sampled. This check is preferably done for every volume's ray. Since the volumes can be sampled separately at each step, their values can be integrated and operated on to provide the desired result.

For lighting of the rendered volume, since each volume can be traversed in its local coordinate system, the light position and eye position is preferably in the corresponding local coordinate system for each volume. To obtain this position, the light and eye coordinates in the world coordinate system can be first rotated by the inverse of the scene rotation which is currently being applied to the volumes. Calculating the basic proportion between the distance from edge to edge for each volume in both local and world coordinate space and then from volume edge to light or eye position in world coordinate space, it is possible to solve for the light or eye position in local coordinate space.

Exemplary GPU Acceleration and Rendering

An exemplary method according to the present disclosure can include GPU acceleration and rendering (210). The exemplary framework for multi-volume ray casting can be readily mapped to the GPU for acceleration. The volume data values can be stored in 3D textures, and thus references to world space refer to the volume's physical position in the 3D scene, while its local space is with regards to the 3D texture coordinate system. In order to properly render the cuboid during passes which require front face culling, the direction of the vertices on the front and back faces can be checked on loading and ensure they are consistent for the datasets (counter-clockwise). For each volume, its eight bounding vertices can be used to construct the six quads which compose the volume cuboid. In an exemplary embodiment, unbounded floating point textures can be used, facilitating the values to remain unsealed (not bound to the [0, 1] range). Preferably, multiple render targets can be used so that the multiple outputs required from some passes can be output at once. The texture outputs can be created to be the size of the render window, representing the final render image plane. For values where the outputs are per-volume, a texture output for each volume can be created.

An exemplary method of mapping each pass to a GPU is described in detail below:

Exemplary Bounding Front Pass: The volume boxes can be rendered with depth testing. For each fragment nearest the virtual camera, its position in world space can be stored in the RGB channels of the output texture.

Exemplary Per-Volume Front Pass: The fronts of each volume box can be rendered individually. For each fragment, its position in world space and its position in its local texture coordinate system can be stored in the RGB channels of two output textures (per volume).

Exemplary Per-Volume Back Pass: Each volume box can be rendered individually with front face culling on. The ray direction and ray starting position (in local texture space) for each volume can be calculated using the corresponding outputs from the previous passes. These results can be stored in the RGB channels of two output textures. The values for the number of steps to entry and steps to exit from the volume extent can be calculated and stored in the alpha channels of the two output textures (per volume).

Exemplary Ray Casting Pass: A single viewport-filling quad can be rendered and the information for the ray casting can be obtained from the two output textures (per volume) obtained in the previous pass. Information regarding the positions of the lights and eye for illumination effects can be passed as uniform parameters for each volume (these values do not change per-volume on a fragment by fragment basis).

Exemplary Optimizations for Prostate Visualization

Aspects of the present disclosure can include optimization for prostate visualization. The exemplary algorithm for multi-volume ray casting described above has been described for general situations, where the regions to be sampled are not necessarily overlapping. However, for the prostate, the segmented region of interest is typically of more interest, which is present in each volume, accordingly, aspects of the present disclosure include some slight simplifications can be made to the exemplary algorithm. For example, for prostate multi-volume rendering, sampling through the following six volumes can be performed, which can include:

1. T2-weighted endorectal axial image data;
2. T2-weighted endorectal sagittal image data;
3. T2-weighted endorectal coronal image data;
4. T1-weighted pelvic axial image data;
5. MRSI calculated ratios; and
6. segmentation of the PZ and CG.

However, since the MRSI values and segmentation information can both be included in volumes with the same settings as the T2-weighted axial image data, four volumes can be processed by the pre-passes. When performing the ray casting, since the segmented region may be of more interest, and the volume including this information may have the same local coordinate system as the T2-weighted axial volume, the positions on each ray can be jumped by the number of steps until the T2-weighted axial volume is entered. Also, since the segmented region will generally be present in the volumes, there is no need to check at each step whether the ray position is currently located inside of each volume. Once the segmented region is reached, the volumes can be sampled until the segmented region is exited. Once the number of steps taken by the rays has passed the number needed to exit the T2-weighted axial volume, the casting for the rays emitted from the same pixel can be ended.

Exemplary Multi-Modal Shading

An exemplary method according to the present disclosure can also include multi-modal shading in process 208. In one example, to calculate the shading at each step along the rays, six values from the five volumes in the dataset (that is, intensity values from the three T2-weighted volumes and one T1-weighted volume, as well as both ratios from the MRSI volume) can be considered. The exemplary shading process can be used to use shading to indicate portions as cancerous or normal. Deciding whether a sample should be labeled as cancerous or normal can be thought of as a group of exemplary if statements. For example, the exemplary statements can include "If the ratio of choline to creatine is above some threshold, or if the ratio of choline plus creatine to citrate is above some level, or if one of the T2-weighted images shows decreased intensity (and if the T1-weighted image does not show an increased intensity for that region), then that region is likely to be cancerous." However, such a coarse classification tends to be unsuitable. First, selecting simply cancer or not for each region can be prone to error, and lacks any gradation from one result to the other. Another problem can be that such a large number of dynamic branches performs very poorly on the SIMD architecture of the GPU. In contrast, exemplary embodiments of the present disclosure map the ray casting algorithm to the GPU to harness its superior processing power.

To overcome these limitations, each sample can be scored, and this score then mapped to color which contributes to the integration of values along the ray. The exemplary formula can be as follows:

$$Score = MRSIA + MRSIB + T2A + T2S + T2C + T1A,$$

where, in one embodiment, the variable can be defined as:
MRSIA=(ratioA−threshMRSI)×percentage×0.5
MRSIB=(ratioB−threshMRSI)×percentage×0.5
T2A=(threshT2−T2axial)×0.333
T2S=(threshT2−T2sagittal)×0.333
T2C=(threshT2−T2coronal)×0.333
T1A=threshT1−T1axial The values ratioA, ratioB, T2axial, T2sagittal, T2coronal, and T1axial can be the sample values at the current position from the MRSI (ratios A and B), T2-weighted axial, T2-weighted sagittal, T2-weighted coronal, and T1-weighted axial volumes, respectively. The threshold values can be originally set to a default value, but can be modified by the user to account for variances in the acquisition parameters of the MR data. The MRSI threshold can be adjusted within the range of [0.0-4.0]. The T2-weighted and T1-weighted images can be windowed to the range of [0.0-1.0], and thus their thresholds can be adjusted in the range of [0.0-1.0]. The higher the score from this formula, the more likely it may be for the sample position to be from a cancerous location. For the volume values, a threshold can be used to classify whether a value is considered cancerous or not. The distance from this threshold can be proportional to the likelihood there is that the sample is cancerous.

For MRSI, since elevated ratios indicate cancer, the threshold can be lower. The opposite can be true for T2-weighted images, where a value lower than the threshold indicates possible malignancy. Since the value from the T1-weighted image is not typically used to detect cancer but rather to discount areas based on a high value, values less than the threshold (in general, neutral) may be of interest. For the MRSI and T2-weighted values, the scores for those individual sections can be weighted so that the total summation of the parts from the same modality can be 1. The percentage of MRSI voxel including prostatic tissue can be used so that MRSI voxels mainly outside the prostate do not have as much influence. This can be also used to control for locations where there are no MRSI values, which would otherwise automatically give a negative contribution to the score.

Alternatively, embodiments of the present disclosure can also include other scoring concepts. For example, embodiments of the present disclosure can provide the concept of a score volume for visualizing the disease and present methods to observe all three types of multi-modal MR data in a single 3D view. User-driven rendering allows for different information to be emphasized based on the user's desires. To this end, an exemplary method of visibility persistence, where a score of interest can automatically maintain visibility when it would be occluded by other scores, while the other scores maintain their normal opacity if they are not occluding the score of interest. To handle rendering in the surrounding prostate anatomy, a single pass multi-volume ray caster accelerated on the GPU can be used. The score volume can also be integrated into a 2D slice-based system.

The exemplary embodiment can include creating a score volume. In one example of a score volume, every voxel includes three values which can be scores corresponding to each of the three types of MR acquisitions. Because a single score volume using all three orthogonal T2-weighted volumes is created, it is preferable to first create an upsampled label map for each T2-weighted volume that is close to isotropic. In general, methods can use iterative dilations and erosions to interpolate middle slices throughout the volume, maintaining both individual segmentations (e.g., PZ and CG), as well as the area of the gland. This interpolation can be repeated until the interslice spacing is no worse than twice the intraslice spacing. The three upsampled label maps can then be combined to form a composite label map, which takes into account the segmentation information from all three T2-weighted volumes, and has an interslice spacing of 0.75 mm. The label map for the T1-weighted image sequence can be likewise upsampled, yielding an interslice spacing of 1.5 mm.

Embodiments of the present disclosure can provide exemplary score volumes that include three score values: a T2 score based on the T2-weighted images, a T1 score based on the T1-weighted images, and an MRSI score. The T1 and MRSI scores can be binary, while the T2 score can be quaternary. The inputs for the creation of the score volume can include five image sequences (e.g., T2-weighted axial prostate scan; T2-weighted sagittal prostate scan; T2-weighted coronal prostate scan; T1-weighted axial pelvic scan; and MRSI axial prostate scan), four upsampled segmentation label maps, and a composite label map.

The exemplary score volume can be created, matching the dimensions and resolution of the composite label map volume, for the prostate region based on the three available MR modes. Scores can be generated separately for each of the three modes: a T2 score based on detecting cancer from the T2-weighted data; a T1 score based on detecting regions of post-biopsy hemorrhage from the T1-weighted data; and an MRSI score based on detecting areas of increased chemical ratios indicating the possibility of cancer occurring in a region from the MRSI data.

Empirically determined thresholds can be used to decide a score for each of the modes. These thresholds can be defined by using a group of three datasets for training and observing the typical signal intensities for normal and abnormal regions in the PZ (decreased for T2, increased for T1, elevated spectra in MRSI). Pathology results can be used to ensure that sampling from sextants known to contain either cancer or hemorrhage was performed. Exemplary scores can be created as follows, with the default values being zero.

T2 Score (PZ): Decreased T2-weighted image intensity in the PZ can be indicative of cancer, and thus the voxels which are below a T2 threshold may be of interest. Since three volumes of T2-weighted data can be used, all of them can be sampled to take advantage of each volume's high intraslice resolution. Each volume's score can contribute one third towards the final score.

T1 Score (PZ): Increased T1-weighted image intensity in the prostate can be indicative of post-biopsy hemorrhage, and thus the voxels which are above a T1 threshold may be of interest. The single T1-weighted volume can contribute to the final score value.

MRSI Score (PZ and CG): An increase in one or both of the spectroscopic ratios in the MRSI data can be indicative of prostate cancer. If either of the two ratios are above the MRSI threshold, then the voxel can be scored as being of interest. This scoring system, unlike for the T2 and T1 scores, can be applied to both the PZ and CG.

T2 Score (SVs): Similar to the T2 scoring for the PZ, decreased T2-weighted image intensity in the SVs can be indicative of cancer. However, the SVs pose a hurdle in that their walls (both interior and exterior) also can appear with decreased T2-weighted intensity. To account for this, a three part scoring process can be used. First, each T2-weighted image sequence (axial, sagittal, and coronal) can be scored individually. Their individual score volumes can then be eroded by a small number of voxels, e.g., two voxels, to remove thin boundaries. The final SV score can be then created with each of the individual scores contributing one third to the final score.

The neighboring regions of the PZ (prostatic capsule and CG) can be generally dark, and thus could yield false positive results if included accidentally as part of the PZ. To account for this, the border voxels are preferably not scored. To ensure that the sampling is from the correct region for each of the three T2-weighted volumes, the upsampled label maps for each volume, and preferably sample that volume only if its label map indicates the region is correct. Likewise, the upsampled label map of the T1-weighted volume can also be provided to ensure values are not from outside the prostate when this volume is sampled. Since areas immediately outside of the prostate are often of increased intensity in T1-weighted data, they could be mistaken as indicators of a hemorrhage if improperly sampled. Trilinear interpolation can be used when sampling from the upsampled label maps and tricubic interpolation can be used when sampling from the original MR datasets.

Exemplary Slice-Based Visualization

The exemplary created score volume can be integrated into a 2D slice-based viewing system to provide guidance for the radiologist in viewing the slices by presenting information from other slices on the slice being viewed. For each voxel in a slice being viewed, the score values from the score volume can be found and overlaid on the grayscale image. Though the score volume can be aligned with the axial T2-weighted image sequence, it can be interpolated to obtain values for the corresponding pixels in the other image sequences. Examples of this are shown in FIG. 11, where the T2 and T1 scores are shown in darker shading (1102) and lighter shading (1104) overlays, respectively. The user can adjust the opacity of the overlays as desired.

Exemplary Visualization

A 3D volume rendered view of medical imagery can be an intuitive method of visualizing the data and obtaining a good sense of the relationship between objects. In an exemplary embodiment, the user can visualize the prostate region (prostate gland and seminal vesicles) and the surrounding anatomy in the pelvic region (bladder, rectum, and bone). For the prostate region, using the score volume allows the user to visualize tumor and hemorrhage locations. The inputs for the volume rendering framework are the following four volume files:
1. Score volume
2. Composite label map volume
3. Upsampled label map of T1-weighted pelvic volume
4. T1-weighted pelvic MR volume The prostate region volumes (composite label map and score) can occupy the same volumetric space. Likewise, the pelvic region volumes (upsampled label map and MR values) can occupy the same volumetric space. For rendering the surrounding anatomy, especially the bones, it is preferable to make use of the pelvic region volumes, which encompass a much greater area than the prostate region volumes. Since it is preferable not to scale the prostate data up to the same size of this pelvic volume, it is preferable to perform multi-volume rendering through these two volumetric spaces. The score and label map volumes can be preprocessed before being taken as input to the rendering framework. The prostate region volumes can be both trimmed so that much of the surrounding area is removed where there is no prostate or SVs labeled. This trimming can be done such that a 3 mm border remains around the cuboid region of interest and will typically reduce its size to 15% of the original. Since the data has been based on binary segmentations with no smooth gradients between labeled and non-labeled regions, the score volume and both label map volumes can be filtered with a 3×3×3 mean filter to improve the rendering results.

Exemplary Prostate Region

The exemplary visualization of the prostate region can be based on using the composite label map volume and the score volume. For rendering the interior areas of the gland and SVs, the volume rendering can be performed on the score volume. The score volume can include three values per voxel, corresponding to the T2-weighted score (indicating cancer in the PZ), T1-weighted score (indicating hemorrhage in the PZ), and MRSI score (indicating cancer anywhere in the gland containing spectroscopic voxels). The user can view each of the values individually, or combined as desired. For the surface of the gland, semi-transparent isosurface rendering of the composite label map can be used directly.

An exemplary color scheme for the score values can also be used. For example, a high T1 score, indicating hemorrhage, can be shown in red. For regions with a high T2 score, blue can be used to represent the location of suspect cancerous areas. For the MRSI score, purple can be used to indicate increased ratios. The prostate gland itself can be rendered as a semitransparent tan color and the seminal vesicles as a semitransparent green color. The transfer functions controlling the gland colors (prostate and SVs) can be applied to the label map volume, while the transfer functions for the score colors can be applied to the score volume. The T2-weighted data itself is not used in the volume rendering.

Figure 12C:
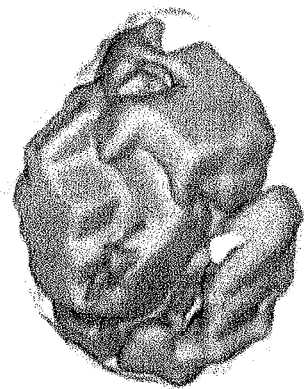
FIGS. 12(a)-(c) are exemplary images of renderings of individual score values according to exemplary embodiments of the present disclosure.
Figure 12B:
Figure 12A:

The user can be presented with two standard options for rendering the prostate score data, for example:

Isosurface Score View: The solid isosurfaces of each of the score values can be viewed. This mode is typically done with a single score value at a time. Examples of the three scores rendered individually can be seen in FIG. 12. FIG. 12(a) is an exemplary rendering of T2 score values with the darker shading indicating cancer. FIG. 12(b) is an exemplary rendering of T1 score values with the darker shading indicating hemorrhages. FIG. 12(c) is an exemplary rendering of MRSI score values with the darker shading indicating elevated ratios. Since the T2 score can be a quaternary value, the isosurface can be set so that a score ≥0.66 is preferred (i.e., at least two of the T2-weighted volumes indicated decreased signal).

Figure 13C:
FIGS. 13(a)-(c) are exemplary images of renderings of score values with various levels of transparency according to exemplary embodiments of the present disclosure.
Figure 13B:
Figure 13A:

Transparent Score View: When viewing multiple scores together, user-defined transparency per score is typically used. This can be useful if the user wants to see relationships and observe overlaps between different scores (e.g., between a cancerous T2 score and a hemorrhage T1 score). Examples of combinations of multiple score renderings with transparency are shown in FIG. 13. FIGS. 13(a)-(c) are exemplary renderings of FIGS. 12(a)-(c) shown with various levels of transparency.

Figure 14:
FIG. 14 is an exemplary image of seminal vesicles indicating bilateral invasion obtained using exemplary embodiments of the present disclosure.

The seminal vesicles can be rendered along with the prostate gland. Since the only score within the seminal vesicles is the T2 score, its coloring can be tied to that of the T2 score for the prostate gland and can use the same blue color. Preferably, the user can maintain separate transparency control over the seminal vesicles. A close-up example of the seminal vesicles with SV invasion indicated are shown in FIG. 14.

In addition to standard rendering of the prostate score volumes noted above, a score rendering called visibility persistence can be provided. This mode can assist in keeping a score of interest (i.e., the persistent score) visible when other scores may occlude it. For this, a second volume rendering integral can be accumulated with reduced color and opacity values for the non-persistent scores. The discretized volume rendering integral can then include the standard front-to-back compositing as such:

$$C_{dst} \leftarrow C_{src} \times (1-\alpha_{dst}) + C_{dst}$$

$$\alpha_{dst} \leftarrow \alpha_{src} \times (1-\alpha_{dst}) + \alpha_{dst}$$

where $$C_{src} \leftarrow C_{gland} + C_{PersistentScore} + C_{OtherScores}$$

$$\alpha_{src} \leftarrow \alpha_{gland} + \alpha_{PersistentScore} + \alpha_{OtherScores}$$

and can also include:

$$C_{dst2} \leftarrow C_{src2} \times (1-\alpha_{dst2}) + C_{dst2}$$

$$\alpha_{dst2} \leftarrow \alpha_{src2} \times (1-\alpha_{dst2}) + \alpha_{dst2}$$

$$\alpha_{score} \leftarrow \alpha_{PersistentScore} \times (1-\alpha_{score}) + \alpha_{score}$$

where $$C_{src2} \leftarrow C_{gland} + C_{PersistentScore} + 0.1 \times C_{OtherScores}$$

$$\alpha_{src2} \leftarrow \alpha_{gland} + \alpha_{PersistentScore} + 0.1 \times \alpha_{OtherScores}$$

Figure 15C:
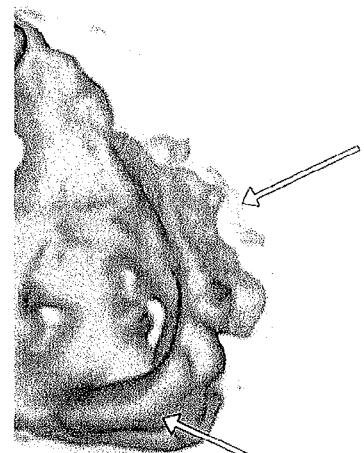
FIGS. 15(a)-(c) are exemplary images of renderings of visibility persistence according to exemplary embodiments of the present disclosure.
Figure 15B:
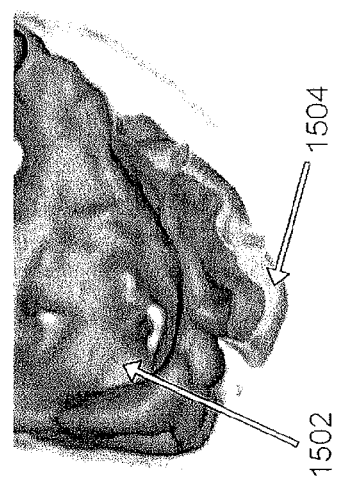
Figure 15A:
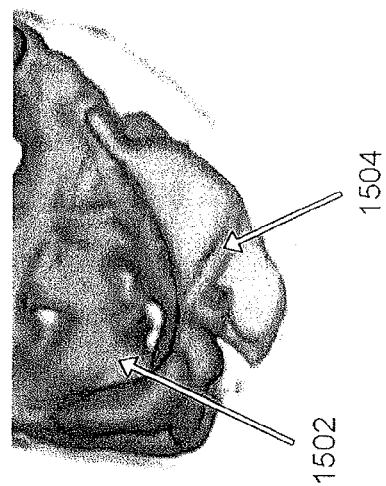

At the end of the volume rendering integral, the final output color and opacity can be composited as such:

$$C_{dst} \leftarrow C_{dst2} \times \alpha_{score} + C_{dst} \times (1-\alpha_{score})$$

$$\alpha_{dst} \leftarrow \alpha_{dst2} \times \alpha_{score} + \alpha_{dst} \times (1-\alpha_{score})$$

where the $\alpha_{score}$ value for blending can be used to prevent a jagged halo effect around the persistent score. As shown in FIG. 15, the spatial relationships of the scores and gland can be fully maintained by this exemplary method. In contrast to making one score transparent to view another occluded behind it, this mode allows for an occluded score to automatically be visible, while the other scores can maintain their full opacity unless they are occluding the score of interest. FIG. 15(a) is an exemplary rendering of normal isosurface rendering of the T2 (1502) and T1 (1504) scores. FIG. 15(b) is an exemplary rendering of the T2 score having visibility persistence. FIG. 15(c) is an exemplary transparent rendering of the T1 score to allow viewing of the T2 score. In the exemplary rendering of FIG. 15(c), the T1 score is non-transparent in regions where it is not occluding the T2 score.

Exemplary Surrounding Anatomy

When including the surrounding anatomy in the rendering, single-pass multi-volume rendering can be used. For each pixel in the rendered image, the ray starting position and direction can be calculated for both the prostate region volume and the pelvic region volume. The steps along each ray can be both adjusted to be the same step size, such that stepping along one ray can be correlated with stepping along the other ray. The number of steps to enter and exit each of the volumes can be calculated. Since the pelvic region is typically larger and fully encompasses the smaller prostate region, a sample position in the prostate region can also be within the pelvic region, though most sample points within the pelvic region will not be within the prostate region. Because of this, the number of steps inside the pelvic region before the ray reaches the prostate region, the number of steps that it will be in both, and the number of steps after the prostate region before exiting the pelvic region can be calculated. Using these values, the rays can be cast through the volumes, and the prostate region can be sampled when the current ray step position is within the correct range.

The pelvis and other nearby bones account for the majority of the area in the pelvic region volumes. When the bones are not being rendered, the minimum and maximum extent of the remaining anatomy (e.g., the bladder and rectum) can be calculated and the sampling rays can be cast through this bounding box, reducing the amount of area being traversed to approximately 10% of the full size. Note that the prostate region can be between these two objects and thus can be included and will not be missed.

Figure 16:
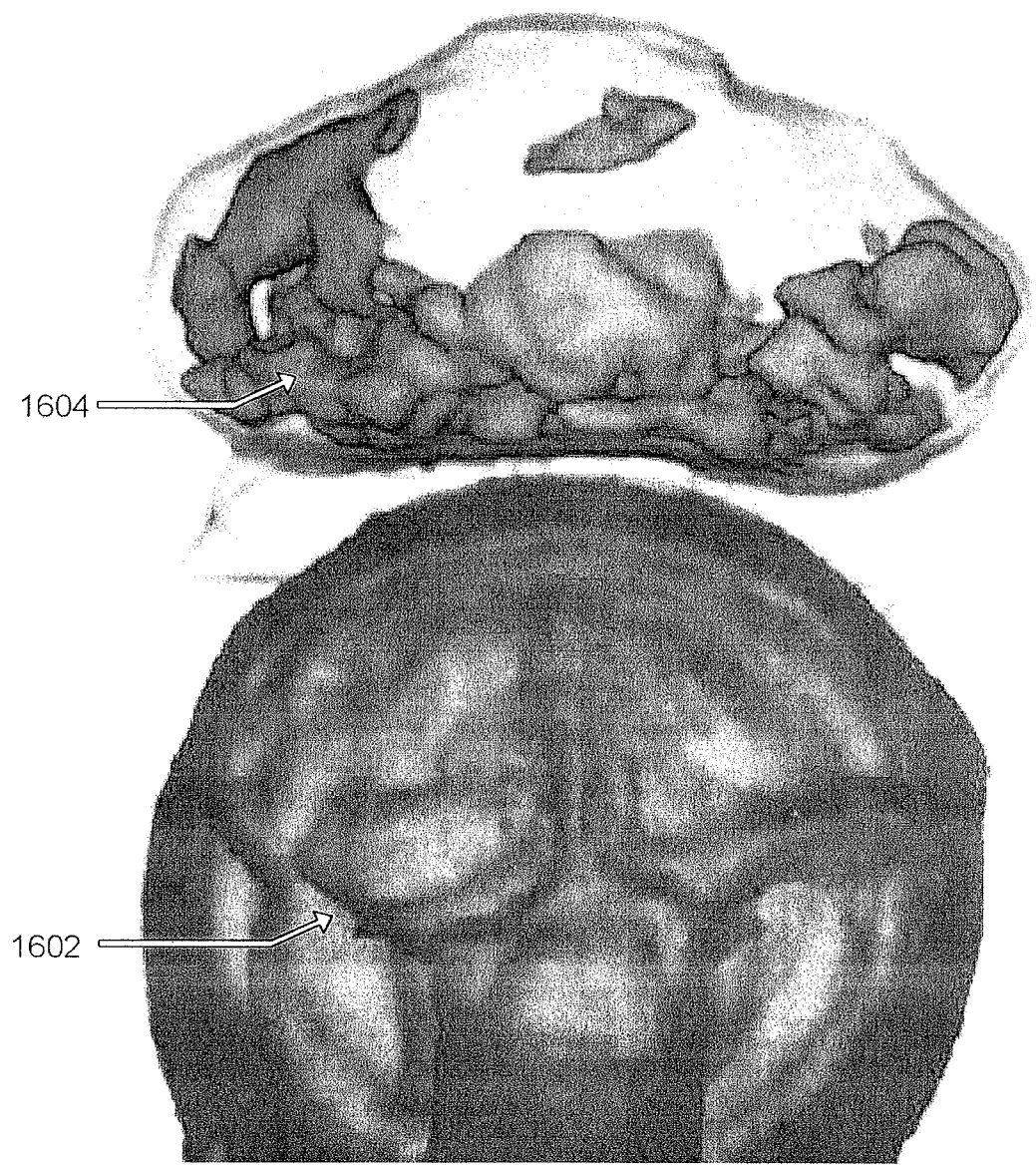
FIG. 16 is an exemplary image of the viewing angle between the prostate and the rectum obtained using exemplary embodiments of the present disclosure.

The rectum (or more properly, the endorectal coil) can be rendered as a semi-transparent isosurface 1602. The user can be able to easily observe the angle between the rectum 1602 and the prostate surface 1604 (see FIG. 16). Similar to the rectum, the bladder can be rendered as a yellow semi-transparent isosurface. The bones can be rendered as slightly off-white isosurfaces. Unlike for the prostate region, the transfer functions controlling the color and opacity values for the pelvic region can be applied to the T1-weighted MR data.

Exemplary Embodiment

An exemplary implementation of an embodiment according to the present disclosure can include the standard clinical protocol for MR imaging of the prostate, where the five MR sequences listed above can be acquired for each patient. The exemplary methods can be tested, for example, on a system running on a Core 2 Quad QX9300 2.54 GHz CPU with 4 GB of RAM and an NVIDIA FX 3700M video card.

Figure 18:
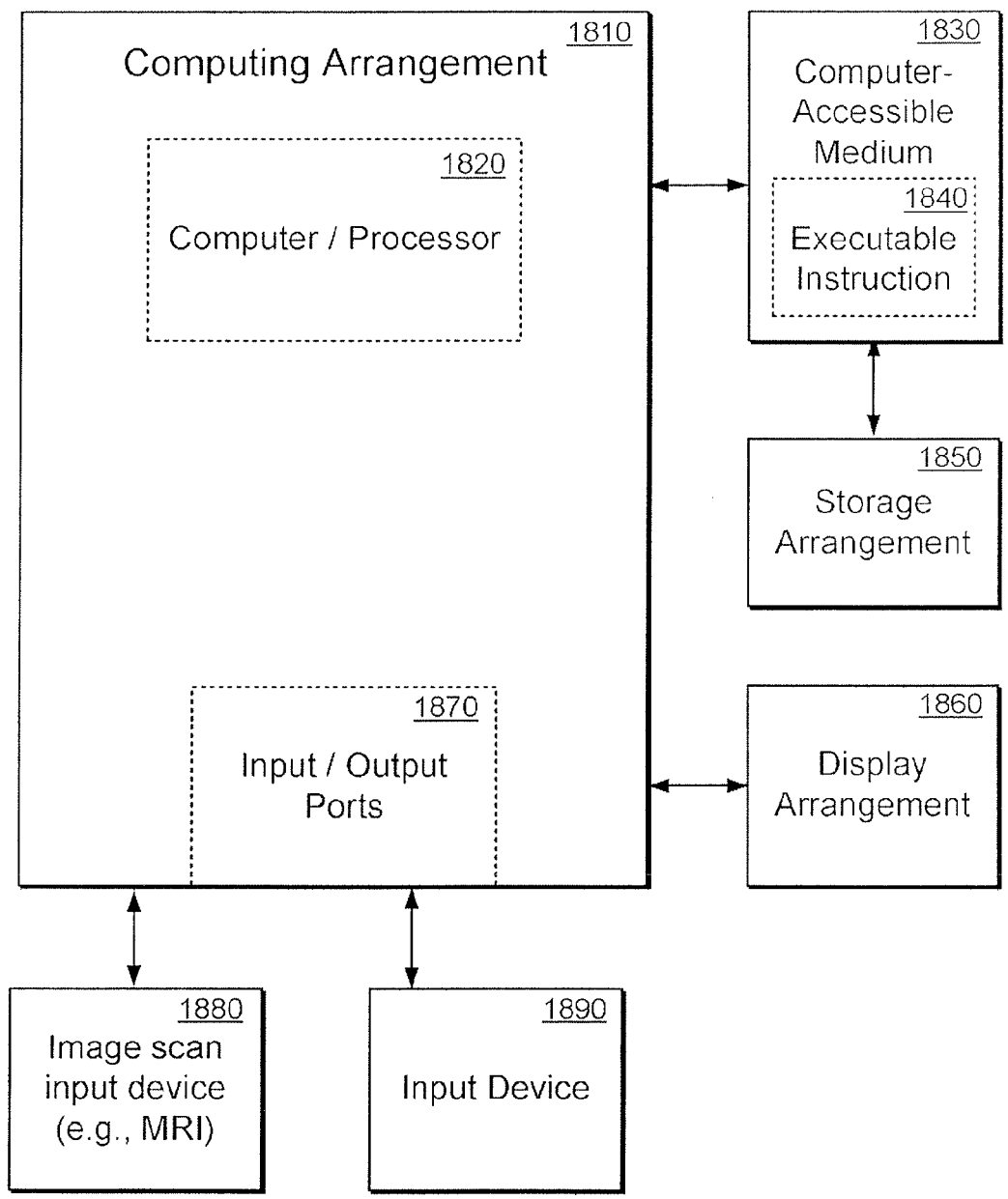
FIG. 18 shows an exemplary block diagram of an exemplary embodiment of a system according to the present disclosure.

FIG. 18 shows an exemplary block diagram of an exemplary embodiment of a system according to the present disclosure. For example, exemplary procedures in accordance with the present disclosure described herein can be performed by or controlled using an MRI 1880, a hardware processing arrangement and/or a computing arrangement 1810, and an input device 1890. Such processing/computing arrangement 1810 can be, e.g., entirely or a part of, or include, but not limited to, a computer/processor 1820 that can include, e.g., one or more microprocessors, and use instructions stored on a computer-accessible medium (e.g., RAM, ROM, hard drive, or other storage device). Preferably, the processing arrangement 1810 includes a GPU which is optimized for performing high speed graphics operations.

As shown in FIG. 18, e.g., a computer-accessible medium 1830 (e.g., as described herein above, a storage device such as a hard disk, floppy disk, memory stick, CD-ROM, RAM, ROM, etc., or a collection thereof) can be provided (e.g., in communication with the processing arrangement 1810). The computer-accessible medium 1830 can contain executable instructions 1840 thereon. In addition or alternatively, a storage arrangement 1850 can be provided separately from the computer-accessible medium 1830, which can provide the instructions to the processing arrangement 1810 so as to configure the processing arrangement to execute certain exemplary procedures, processes and methods, as described herein above, for example.

Further, the exemplary processing arrangement 1810 can be provided with or include an input/output arrangement 1870, which can include, e.g., a wired network, a wireless network, the internet, an intranet, a data collection probe, a sensor, etc. As shown in FIG. 18, the exemplary processing arrangement 1810 can be in communication with an exemplary display arrangement 1860, which, according to certain exemplary embodiments of the present disclosure, can be a touch-screen configured for inputting information to the processing arrangement in addition to outputting information from the processing arrangement, for example. Further, the exemplary display 1860 and/or a storage arrangement 1850 can be used to display and/or store data in a user-accessible format and/or user-readable format.

The initial virtual camera orientation for the volume rendering can be LPS (Left-Posterior-Superior) orientation, which is the standard DICOM orientation. Intuitive navigation around the scene can use arcball rotation based at the center of the prostate region. Ray casting can be performed by a GPU. The label map volumes can be stored in RGBA textures, where the alpha component indicates the existence of a value in the RGB components. Each score value or segmentation label can be stored in its own channel, allowing utilization of the highly efficient linear interpolation of the GPU when determining what object a sample point belongs to.

The step size for the ray casting depends on whether or not the user is also viewing the surrounding anatomy. Since the pelvic region volume data is much larger than the prostate region and is of half the resolution, a larger step size can be used to improve performance. When the surrounding anatomy is included, a step size of 0.5 mm can be used. When only the prostate region is being rendered, a step size of 0.25 mm can be used. The compositing of samples along the ray can be adjusted based on the step size such that the view is consistent between rendering with and without the surrounding anatomy. Stochastic jittering can be used to reduce woodgrain artifacts. Early ray termination ($\alpha > 0.95$) can be used when rendering the surrounding anatomy.

The exemplary embodiment can include four basic computational processes. Given the four label map segmentations, they can be first upsampled. The three upsampled T2-weighted label maps can then be combined to form a composite label map. This composite label map, along with the original MR volumes, can then be used to create the score volume. Finally, the score volume and composite label map volume can be trimmed and these two along with the upsampled T1-weighted label map are mean filtered to improve the rendering results.

The performance of the volume rendering varies depending on what regions and objects are being viewed. The renderings maintain interactive performance. FIG. 17 shows the four basic types of rendering that have differing performance (all objects, without bone, prostate only, and persistence), and their performance in frames per second (fps). These are rendered at an image size of 512×512 pixels.

Exemplary Evaluation

Although the current focus can be on developing the visualization techniques for a CaP detection system, the exemplary scoring system was compared against the results of the ACRIN 6659 study. For this exemplary study, the MR acquisitions were performed on patients 4-6 weeks after needle biopsy and before radical prostatectomy. The determinations of both radiologists and pathologists were denoted for the six sextants of the prostate. Because the results from the MRSI can be very broad and non-specific, the T2 and T1 scores were considered in the evaluation.

For each patient dataset, a total of eight radiologists would review the MR data and make determinations as to the presence of cancer and hemorrhage on a per-sextant basis. For the cancer determinations, a ranking on a scale of one to five can be used, with one indicating definitely no cancer and five indicating definitely cancer. For the exemplary comparison, the minimum and maximum rankings were not used, the remaining six can be averaged, and a ranking of three or greater can indicate cancer. For determining hemorrhage, the radiologists' results can be taken as the standard since this is not indicated from the pathology. For the determination of cancer, the radiologists' results can be used for comparison.

Given the excised prostate, a pathological analysis can be performed on it, and results can be reported for cancer in the prostate, again on a per-sextant basis. The pathology report can also indicate whether or not there was invasion of the seminal vesicles. The results from the pathology (both cancer determination in the prostate and seminal vesicle invasion) can be taken as the standard in evaluating the exemplary system.

The results of testing the exemplary system on three datasets are summarized in Tables 1-3. For the determination of cancer in a sextant (Table 1), the results from the exemplary system were better than from the radiologists. The exemplary results for the exemplary method for detecting SV invasion is shown in Table 2. For the detection of hemorrhages (Table 3), the simple threshold method can be quite efficient.

TABLE 1

Sextant evaluation for cancer in the prostate (pathology is ground truth).

| Cancer Diagnosis | Pathology (# Sextants) | $T_2$ Score (# Correct) | Radiologists (# Correct) |
|---|---|---|---|
| cancer | 15 | 14 | 7 |
| no cancer | 3 | 3 | 2 |

TABLE 2

Seminal vesicle evaluation for cancer invasion (pathology is ground truth).

| Seminal Vesicle Invasion | Pathology (# Cases) | $T_2$ Score (# Correct) |
|---|---|---|
| yes | 2 | 1 |
| no | 1 | 0 |

TABLE 3

Sextant evaluation for hemorrhage (radiologists' determination is ground truth).

| Post-Biopsy Hemorrhage | Radiologists (# Sextants) | $T_1$ Score (# Correct) |
|---|---|---|
| hemorrhage | 6 | 6 |
| no hemorrhage | 12 | 12 |

Figure 6:
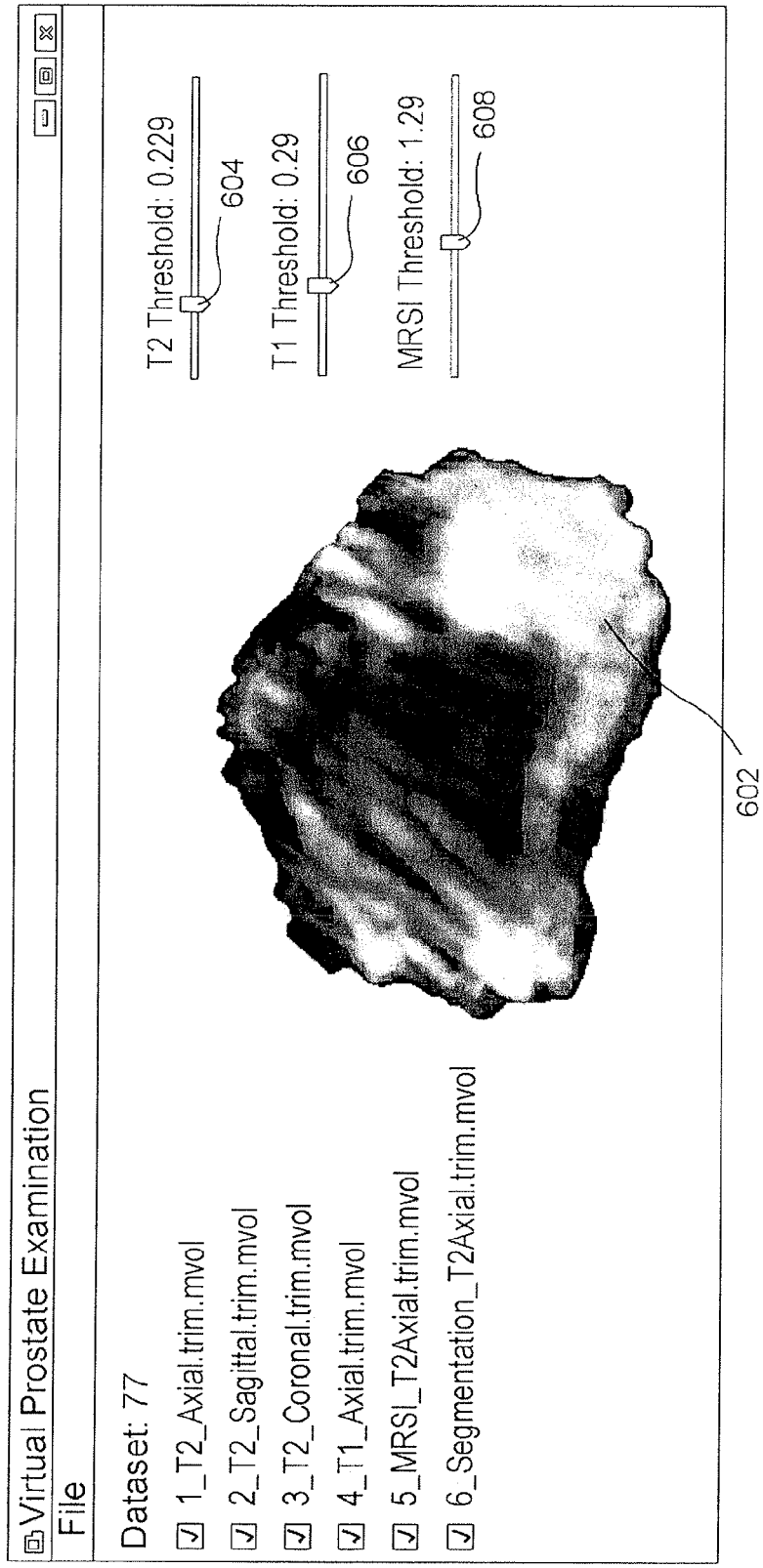
FIG. 6 is an exemplary screen shot illustrating an interface screen according to an exemplary embodiment of the present disclosure.

An exemplary screenshot of a graphical user interface (GUI) for the exemplary multi-volume multimodal rendering system (showing the detected cancer—602) is illustrated in FIG. 6. Because the exact acquisition parameters can vary between datasets, three slider bars 604, 606, 608 can be provided on the right side of the interface which allow the user to interactively adjust the three threshold values. To reduce sampling artifacts in the rendering, a step size of 0.25 mm can be used in keeping with the Nyquist-Shannon sampling theorem (the highest resolution in the data is approximately 0.5 mm).

Figure 7A:
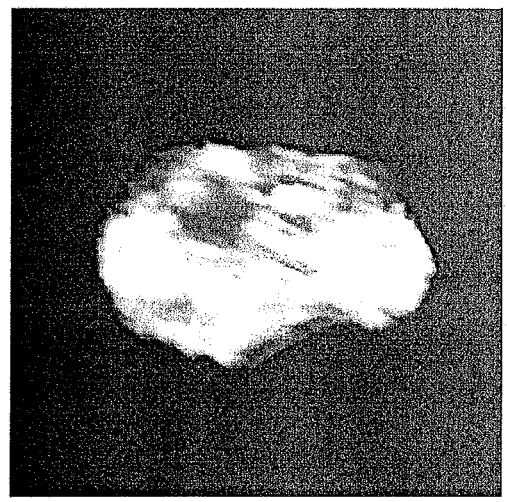
FIGS. 7(a)-(c) are exemplary images showing the effect of altered threshold values obtained using exemplary embodiments of the present disclosure.
Figure 7B:
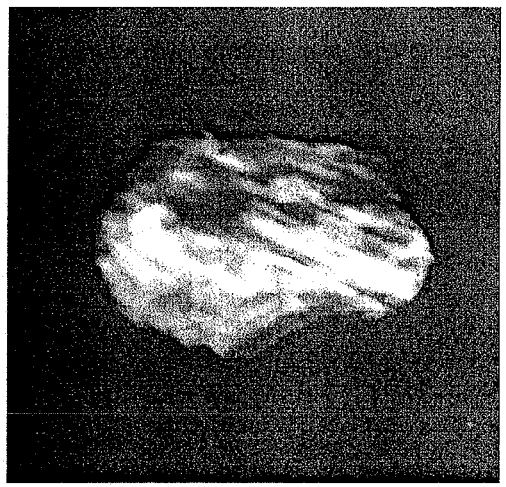
Figure 7C:
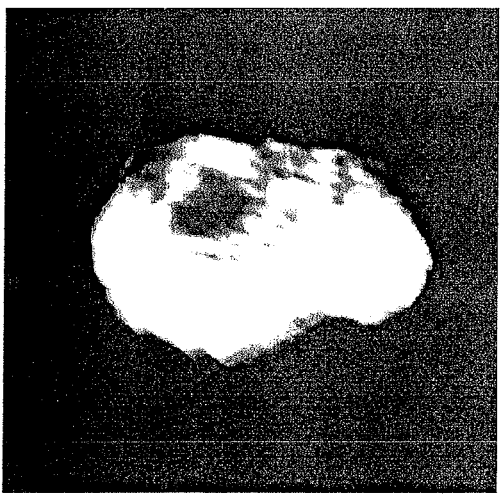

The exemplary result of this exemplary rendering framework can be seen in FIG. 7(*a*). The pathology performed on the radical prostatectomy specimen, for example, found a high score Gleason 7 cancer in both the left and right midgland and base regions, which are highlighted as "suspicious" in the exemplary rendering. A false positive section at the top of the apex is also observed.

FIGS. 7(*b*)-(*c*) show how modifying the thresholds affects the rendered image. Because of the low resolution in the z-direction, the rendered view can take on a bit of a stepped appearance, where the boundary between slices can be seen. FIG. 7(*b*) shows an exemplary rendering of increasing the MRSI ratio threshold in less areas being shown as suspicious. FIG. 7(*c*) shows an exemplary rendering of increasing the T2-weighted threshold results in more areas being shown as suspicious. If a smoothed look is preferred, a smooth surface could be fit around the segmentation. To increase the z-resolution, it might also be possible to use exemplary techniques to insert slices, which could also be segmented to smooth the boundary between the PZ and CG. Although several volumes are preferably sampled at each point and a score calculated to obtain an index for the transfer function, the small size of the volumes and the efficient scoring equation, for example, allow for the image to be rendered at interactive frame rates of approximately 12 frames per second in a render view of 512×512 pixels. The coding for the exemplary system can be written in C++ and can use OpenGL and Cg vertex and fragment shaders for the visualization. The exemplary methods can be tested, for example, on a system running on a Core 2 Quad QX9300 2.54 GHz CPU with 4 GB of RAM and an NVIDIA FX 3700M video card.

Another exemplary embodiment of the present disclosure can provide a method for upsampling prostrate segmentation labelmap slices prior to combining multiple views into a single composite labelmap to produce a smoother and more realistic rendering. Preferably, the exemplary methods incorporate ternary segmentation, and thus, an exemplary ternary shape based segmentation interpolation method in which known regions can be dilated into unknown regions to form the final shape in an interpolated slice can be provided. Preferably, information from multiple labelmaps can be used to create the final upsampled labelmap. The exemplary method can be fast, easy to implement, and suitable for CaP visualization needs.

Exemplary Upsampling Method

According to another exemplary embodiment of the present disclosure can provide an exemplary method of upsampling. For example, three T2-weighted image sequences, which are approximately orthogonal, can be used so that the final shape from the segmentations and upsampling can be as accurate as possible. Specifically, the three scans used, e.g., can be a T2-weighted endorectal axial scan, a T2-weighted endorectal coronal scan, and a T2-weighted endorectal sagittal scan. A sample slice from each of these scans is shown in FIG. 8. FIG. 8(a) shows an exemplary T2-weighted endorectal axial slice. FIG. 8(b) shows an exemplary T2-weighted endorectal sagittal slice. FIG. 8(c) shows an exemplary T2-weighted endorectal coronal slice. The relationship between the scans is shown in FIG. 4, with the axial slice (408), the sagittal slice (402), and the coronal slice (406). Also shown is a T1-weighted slice (404). For these T2-weighted image sequences, the data can be acquired with approximately 0.55 mm intra-slice and 3 mm inter-slice spacing. These scans can be acquired during a single session without patient movement, and thus can be naturally aligned using their position and orientation information.

The segmented volumes of three orientations of T2-weighted data (e.g., axial, coronal and sagittal) can be the inputs to the exemplary upsampling method. These segmentations are preferably in the form of ternary labelmaps. These labelmap volumes can include ternary segmentation information, rather than simply a binary segmentation, because the zonal anatomy of the prostate can be taken into account. Each labeled voxel can be indicated as either not belonging to the prostate, belonging to the region of the PZ, or belonging to the remaining portion on the gland. This remaining portion can include both the CG region and the fibromuscular stroma, however, this labeled region will be simply referred to as the CG region.

Using the image position, resolution, and orientation information from the DICOM data, the image volumes can be aligned properly in 3D space with respect to each other. An example of this accurate alignment of the four image sequences of one dataset is shown in FIG. 4(b). Because of this alignment, registration is not necessary, and corresponding voxel positions can be easily found between the three volumes. In other embodiments of the present disclosure, the image sequences may be acquired in more than a single session, or the patient may have moved during the sequences during a single imaging session. In these cases, it is generally preferable for these images to be registered in accordance with various registration processes.

Exemplary Labelmap Upsampling

An exemplary upsampling method according to an exemplary embodiment of the present disclosure is shown in FIG. 19. The first part of the exemplary upsampling method can include upsampling each T2-weighted ternary labelmap volume separately along its z-axis by interpolating new slices in order to reduce the inter-slice spacing to the level of the intra-slice spacing. The ternary segmentation can be encoded, for example, into the voxels as follows: voxels not belonging to the prostate can be assigned a value of 0, voxels belonging to the PZ can be assigned a value of 10, and voxels belonging to the CG can be assigned a value of 30. The result of the exemplary upsampling will likewise include these three values when completed. Embodiments of the present disclosure can provide a simple method based on iterative erosions and dilations which will take this ternary data into account, preserving the shape of the entire gland as well as of the individual zonal regions.

An interpolated slice can be created midway between each pair of neighboring slices in the original labelmap volume (1902). The exemplary algorithm can include four steps which are performed on the interpolated slice that is to be created. These four steps can be repeated as needed to reduce the inter-slice spacing of the volume to the level of the intra-slice spacing. In the description below, the use of the term neighboring voxels refers to the two neighboring voxels from the two neighboring slices. That is, given two slices A and B, for the interpolated slice AB between A and B, a voxel vAB with position (x, y) in the interpolated slice can include two neighbor voxels vA and vB with position (x, y) in slices A and B, respectively.

The first step in this exemplary algorithm can be an initial labeling of the voxels in the interpolated slice (block 1904). For the voxels vAB in the interpolated slice, its value can be set to be the mean of the two neighboring voxels, vA and vB. If both neighboring voxels are labeled as non-prostate, then the corresponding interpolated voxel is likely also non-prostate and is correctly labeled 0. If both neighboring voxels are either PZ or CG, then the corresponding interpolated voxel is likely also PZ or CG, and it is correctly labeled as 10 or 30, respectively. If one neighboring voxel is PZ and the other is CG, then the interpolated voxel will likely be in the prostate, but it is as yet undetermined as to whether it should be labeled as PZ or CG (its current value is set to 20). If the interpolated voxel is between a prostate voxel and a non-prostate voxel, then it will be labeled as uncertain (value of 5 or 15) and will be further processed.

The second step can be an erosion of the areas that have been labeled as uncertain (labeled as 5 or 15) (block 1906); that is, areas that could be inside or outside of the prostate. If an area is known to belong to the prostate, it can be referred to as certain (note that voxels which must belong to the prostate but can be either PZ or CG are referred to as certain but undetermined). The uncertain regions can be eroded by performing iterative dilations on the certain regions into the uncertain regions. After this step, the voxels in the interpolated slice can be labeled as one of the four certain types. Note that the undetermined voxels (labeled as 20) can also be dilated, such that they grow outwards from their initial locations.

The third step can include re-labeling voxels as belonging to the PZ or CG (block 1908). For this step, a decision can be made for the undetermined voxels (labeled as 20). Since this region was grown during the previous step, some of these undetermined voxels, for example, may now have a prostate label in one neighboring slice and a non-prostate label in the other neighboring slice. Since these voxels are likely included within the prostate, they can be labeled with the PZ or CG label from its corresponding prostate neighbor (value 10 or 30).

The next step for the exemplary z-resolution upsampling can be a further erosion of the remaining undetermined voxels (labeled as 20), which belong to the prostate but are not yet labeled as PZ or CG (block 1910). These voxels can be eroded similarly to the second step above, though preferably, the PZ labels (value of 10) and CG labels (value of 20) are allowed to grow into them, as it is known that the voxel belongs to the prostate and thus the non-prostate voxels (value of 0) are preferably not allowed to grow into them. After this step, the voxels in the prostate will preferably be labeled as belonging to either the PZ or CG.

After these four steps, the voxels are preferably labeled as either non-prostate (value of 0), PZ region (value of 10), or CG region (value of 30), preserving the ternary state of the labelmap. This exemplary method is preferable over a conventional binary shape-based interpolation approach in order to avoid gaps. If each prostate region (PZ and CG) is interpolated separately, gaps can occur in the resulting interpolated labelmap that should be covered by the prostate. An example of this problem is shown in FIGS. 9(a)-(d). FIGS. 9(a)-(d) show illustrations of exemplary ternary labelmap interpolation. In FIGS. 9(a)-(d), the PZ label is shown as 904 and the CG is labeled 902. FIGS. 9(a) and (b) show two neighboring slices from the original labelmap volume. FIG. 9(c) shows an interpolated slice where the PZ and CG regions are interpolated separately, resulting in a large missing area where the prostate should be. FIG. 9(d) shows an exemplary result from the exemplary ternary method, where the shape of the overall prostate segmentation has been preserved an no prostate area is missing.

Exemplary Composite Labelmap

The second part of the exemplary upsampling algorithm can include creating a composite upsampled labelmap volume. The three upsampled labelmap volumes from the T2-weighed data can be used in creating this composite volume, capitalizing on the good intra-slice resolution of the generally orthogonal datasets. That is, the axial volume can be taken as the canonical orientation for xyz, then it may have good resolution in x and y, but poor in z, and thus the segmentation might be off slightly in that dimension. However, the coronal volume may have good resolution in x and z, while the sagittal volume may have good resolution in y and z. In this way, each dimension may be encompassed by the good intra-slice resolution data from two volumes.

For this exemplary composite labelmap, the axial T2-weighted upsampled labelmap can be used as the coordinate system. For each voxel in the composite volume, an average labelmap can be computed using the labelmap values from the three upsampled labelmaps. Areas where either two or all three segmentations agree are preserved. That is, at least two of the three upsampled labelmaps preferably agree that a voxel is in the prostate in order for it to be labeled as such, helping to remove outliers. This composite labelmap can result in a more accurate and visually pleasing representation of the prostatic volume.

Figure 10A:
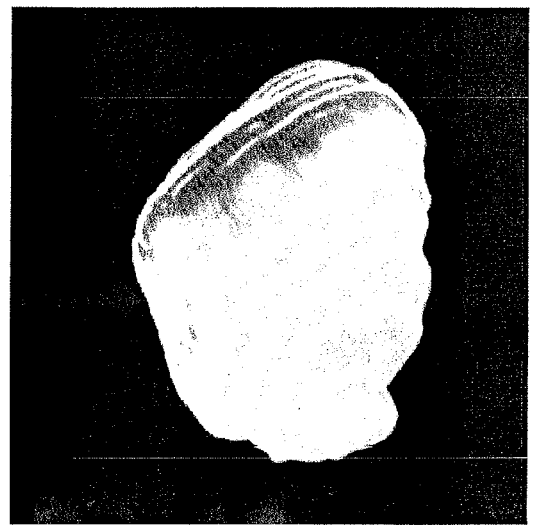
FIGS. 10(a)-(c) are exemplary images obtained using composite segmentation upsampling according to exemplary embodiments of the present disclosure.
Figure 10B:
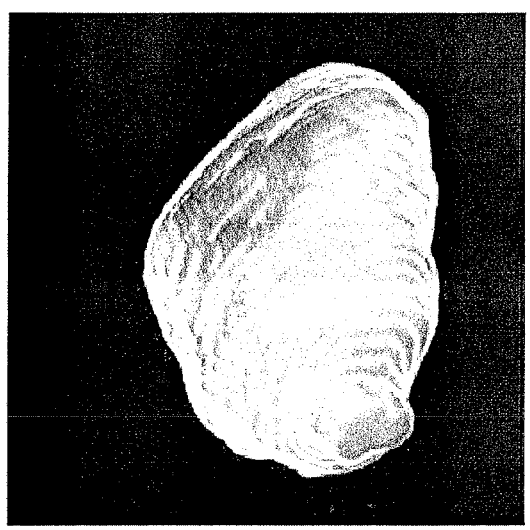
Figure 10C:
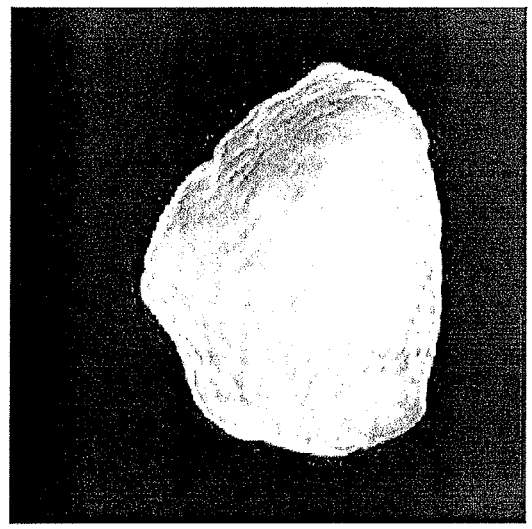

Exemplary results of an exemplary implementation of the exemplary simple prostate upsampling are shown for one dataset in FIG. 10. The voxel spacing from the original image sequences is 0.55×0.55×3 mm for each of the sequences (e.g., axial, sagittal, and coronal). For this resolution of data, the upsampling interpolation can be performed twice for each of the three T2-weighted image volumes, yielding an inter-slice resolution of 0.75 mm. FIG. 10(a) shows an isosurface rendering of the original segmented prostate from the T2-weighted axial image sequence. Due to the large inter-slice gap, obvious plateaus can be visible where each slice was segmented. FIG. 10(b) shows a rendering of the exemplary result from upsampling the axial sequence alone. The plateau artifacts have been greatly reduced, though are still somewhat disturbing. FIG. 10(c) shows a rendering of the final composite segmentation based on combining the upsampling of the axial, sagittal, and coronal sequences. The faceted artifacts have been further reduced, and the entire shape of the prostate can be more full and accurate due to the contributions to the shape from the sagittal and coronal views.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. In addition, all publications and references referred to above can be incorporated herein by reference in their entireties. It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it can be explicitly being incorporated herein in its entirety. All publications referenced can be incorporated herein by reference in their entireties.

What is claimed is:

1. A method for detecting a disease of a prostate, comprising:
   receiving an image dataset acquired with at least one acquisition mode;
   segmenting a region of interest including the prostate from the dataset;
   applying conformal mapping to map the region of interest to a canonical shape;
   generating a 3D visualization of the prostate using the canonically mapped dataset; and
   applying computer aided detection (CAD) to the canonically mapped volume to detect a region of disease of the organ.

2. The method of claim 1, wherein the disease includes a cancer.

3. The method of claim 1, wherein the dataset comprises a plurality of datasets acquired with at least two different acquisition modes.

4. The method of claim 1, further comprising registering the plurality of datasets.

5. The method of claim 1, further comprising correlating the plurality of datasets.

6. The method of claim 1, wherein the computer-aided arrangement includes an electronic biopsy.

7. The method of claim 1, fwherein the conformal mapping further comprises the use of texture analysis.

8. A method for volume rendering of an organ, comprising:
   receiving a plurality of datasets acquired with at least two acquisition modes;
   segmenting the plurality of datasets to define a region of interest;
   executing a multi-volume ray casting algorithm;
   performing multi-modal shading;

processing the plurality of datasets using the boundary pre-passes and the multi-volume ray casting algorithm;

generating an image of the organ using the processed plurality of datasets; and detecting a disease of the organ using a computer-aided arrangement.

9. The method of claim 8, wherein the plurality of datasets includes at least one of a T2-weighted endorectal axial scan; a T2-weighted endorectal sagittal scan; a T2-weighted endorectal coronal scan; a T1-weighted pelvic axial scan; and a MRSI.

10. The method of claim 8, wherein segmenting includes manually segmenting at least a portion of the plurality of datasets.

11. The method of claim 8, further comprising upsampling at least a portion of the plurality of datasets to create an upsampled volume, and the image is generated using the upsampled volume.

12. The method of claim 11, wherein the upsampling includes creating an interpolated slice between two neighboring slices.

13. The method of claim 12, wherein the upsampling includes labeling at least some voxels of the interpolated slice.

14. The method of claim 13, wherein the upsampling includes eroding at least some voxels labeled as undetermined or uncertain.

15. The method of claim 8, wherein the multi-volume ray casting algorithm includes a plurality of boundary pre-passes configured to identify at least one of a direction for each ray and a step size for each ray.

16. The method of claim 15, wherein the plurality of boundary pre-passes identifies at least one of a starting position in world space for each ray and a starting position in local space for each ray.

17. The method of claim 8, wherein the multi-volume ray casting algorithm includes a single pass performing a ray casting via a single traversal.

18. The method of claim 8, further comprising extracting the plurality of datasets and combining images to form a plurality of volumes.

19. The method of claim 18, further comprising scoring the volumes to facilitate a diagnosis of a disease.

20. The method of claim 8, wherein extracting the plurality of datasets includes aligning the volumes in a world space.

21. The method of claim 20, wherein the disease is cancer.

22. The method of claim 8, wherein the organ is a prostate.

23. The method of claim 8, further comprising classifying at least portions of the generated image as at least one of cancerous or normal.

24. The method of claim 23, wherein the classifying includes scoring at least a portion of the processed data set.

25. The method of claim 8, further comprising creating a score volume including at least one score, each score associated with at least one of T2-weighted images, T1-weighted images, or MRSI images.

26. The method of claim 25, wherein the image is generated at least partially based on the score volume.

27. The method of claim 8, further comprising processing the plurality of datasets into at least one 3-dimensional texture.

28. The method of claim 27, wherein the 3-dimensional texture include a volume cuboid.

29. A system for multi-modal volume rendering of an organ, comprising:

an imaging arrangement configured to acquire an image dataset acquired with at least one acquisition mode; and a computing arrangement configured to segment a region of interest including the prostate from the dataset, apply conformal mapping to map the region of interest to a canonical shape, generate a 3D visualization of the prostate using the canonically mapped dataset, and apply computer aided detection (CAD) to the canonically mapped volume to detect a region of disease of the organ.

30. A non-transitory computer readable medium including instructions thereon that are accessible by a hardware processing arrangement, wherein, when the processing arrangement executes the instructions, the processing arrangement is configured to:

receive an image dataset acquired with at least one acquisition mode;

segment a region of interest including the prostate from the dataset;

apply conformal mapping to map the region of interest to a canonical shape;

generate a 3D visualization of the prostate using the canonically mapped dataset; and apply computer aided detection (CAD) to the canonically mapped volume to detect a region of disease of the organ.

* * * * *